United States Patent
Park et al.

(10) Patent No.: US 11,770,029 B2
(45) Date of Patent: Sep. 26, 2023

(54) WIRELESS POWER TRANSMISSION DEVICE

(71) Applicant: LG ELECTRONICS INC., Seoul (KR)

(72) Inventors: Joonho Park, Seoul (KR); Bongsik Kwak, Seoul (KR); Sungkyu Kim, Seoul (KR); Seonghun Lee, Seoul (KR); Jihyun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 136 days.

(21) Appl. No.: 17/282,654

(22) PCT Filed: Oct. 4, 2019

(86) PCT No.: PCT/KR2019/013014
§ 371 (c)(1),
(2) Date: Apr. 2, 2021

(87) PCT Pub. No.: WO2020/071842
PCT Pub. Date: Apr. 9, 2020

(65) Prior Publication Data
US 2021/0351627 A1    Nov. 11, 2021

(30) Foreign Application Priority Data

Oct. 4, 2018    (KR) .................. 10-2018-0118250
Oct. 4, 2018    (KR) .................. 10-2018-0118251
Oct. 4, 2018    (KR) .................. 10-2018-0118252

(51) Int. Cl.
*H02J 50/40*    (2016.01)
*H02J 50/80*    (2016.01)
(Continued)

(52) U.S. Cl.
CPC ............ *H02J 50/402* (2020.01); *H02J 50/10* (2016.02); *H02J 50/60* (2016.02); *H02J 50/80* (2016.02); *H04B 5/0087* (2013.01)

(58) Field of Classification Search
CPC .......... H02J 50/402; H02J 50/10; H02J 50/60; H02J 50/80; H04B 5/0087
See application file for complete search history.

(56) References Cited

U.S. PATENT DOCUMENTS 9,774,208 B2    9/2017 Qian et al.
2010/0187912 A1 *    7/2010 Kitamura ............... H02J 50/40
                                                                   307/104
(Continued)

FOREIGN PATENT DOCUMENTS

JP    2018-129942 A    8/2018
KR    10-2011-0134970 A    12/2011
(Continued)

*Primary Examiner* — Rexford N Barnie
*Assistant Examiner* — Rasem Mourad
(74) *Attorney, Agent, or Firm* — Birch, Stewart, Kolasch & Birch, LLP

(57) ABSTRACT

The present disclosure relates to a wireless power transmission device. A wireless power transmission device according to an embodiment of the present disclosure includes: a coil part including a plurality of partially overlapping coils; a coil combination generator configured to generate coil combinations including at least one of the plurality of coils; and a controller configured to transmit a coil selection signal through the coil combinations and to select an operating coil combination from the coil combinations based on a response intensity of a response signal for the coil selection signal and charging efficiency of a wireless power reception device. Accordingly, a high-efficiency charging area can be extended in partially overlapping multiple coils.

20 Claims, 17 Drawing Sheets

(51) Int. Cl.
   *H02J 50/10* (2016.01)
   *H02J 50/60* (2016.01)
   *H04B 5/00* (2006.01)

(56) References Cited

U.S. PATENT DOCUMENTS

| | | | | |
|---|---|---|---|---|
| 2010/0259217 A1* | 10/2010 | Baarman | ............... | H02J 7/0013 |
| | | | | 320/108 |
| 2012/0228957 A1 | 9/2012 | Miyauchi | | |
| 2013/0281155 A1* | 10/2013 | Ogata | ................. | H04B 1/3883 |
| | | | | 455/556.1 |
| 2016/0233724 A1* | 8/2016 | Bae | ...................... | H04B 5/0037 |
| 2017/0237296 A1* | 8/2017 | Keith | ...................... | H02J 50/12 |
| | | | | 307/104 |
| 2019/0363758 A1* | 11/2019 | Shichino | .................. | H04B 5/02 |

FOREIGN PATENT DOCUMENTS

| | | |
|---|---|---|
| KR | 10-2011-0137393 A | 12/2011 |
| KR | 10-2016-0026556 A | 3/2016 |
| KR | 10-2017-0054708 A | 5/2017 |
| KR | 10-1745735 B1 | 6/2017 |
| KR | 10-2017-0109299 A | 9/2017 |
| KR | 10-2018-0001783 A | 1/2018 |
| KR | 10-2018-0056181 A | 5/2018 |
| WO | WO 2012/008693 A2 | 1/2012 |
| WO | WO 2018/034392 A1 | 2/2018 |

* cited by examiner

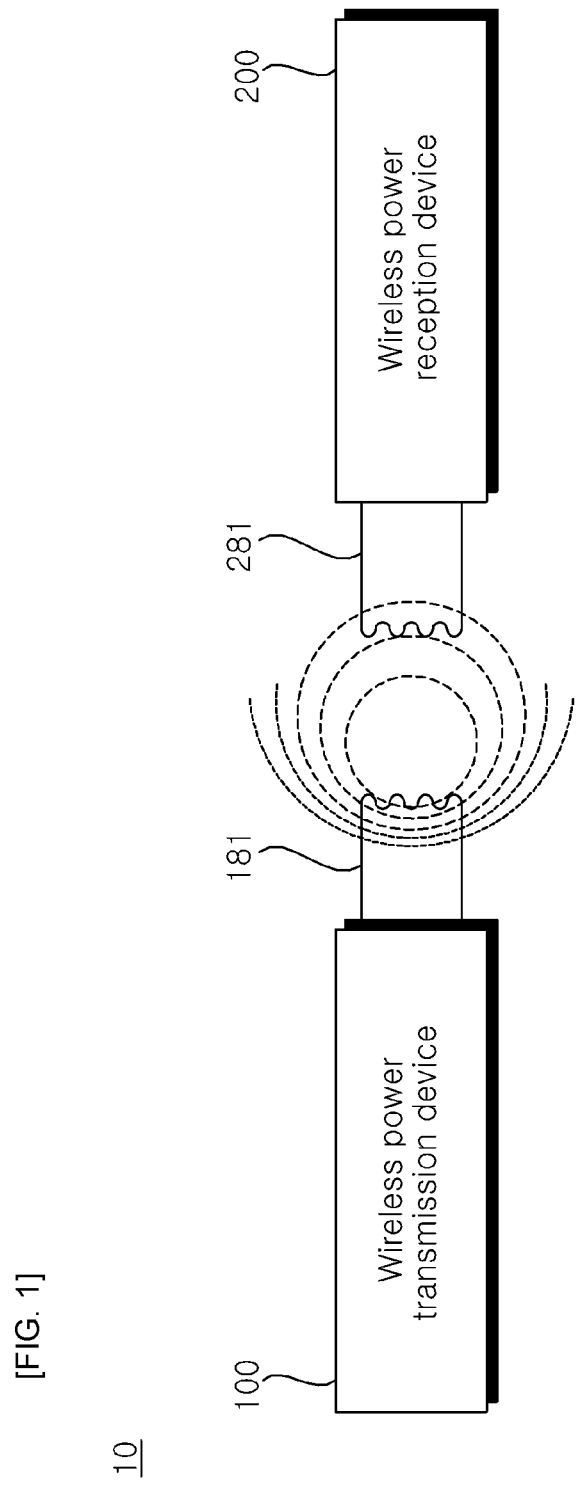
[FIG. 1]

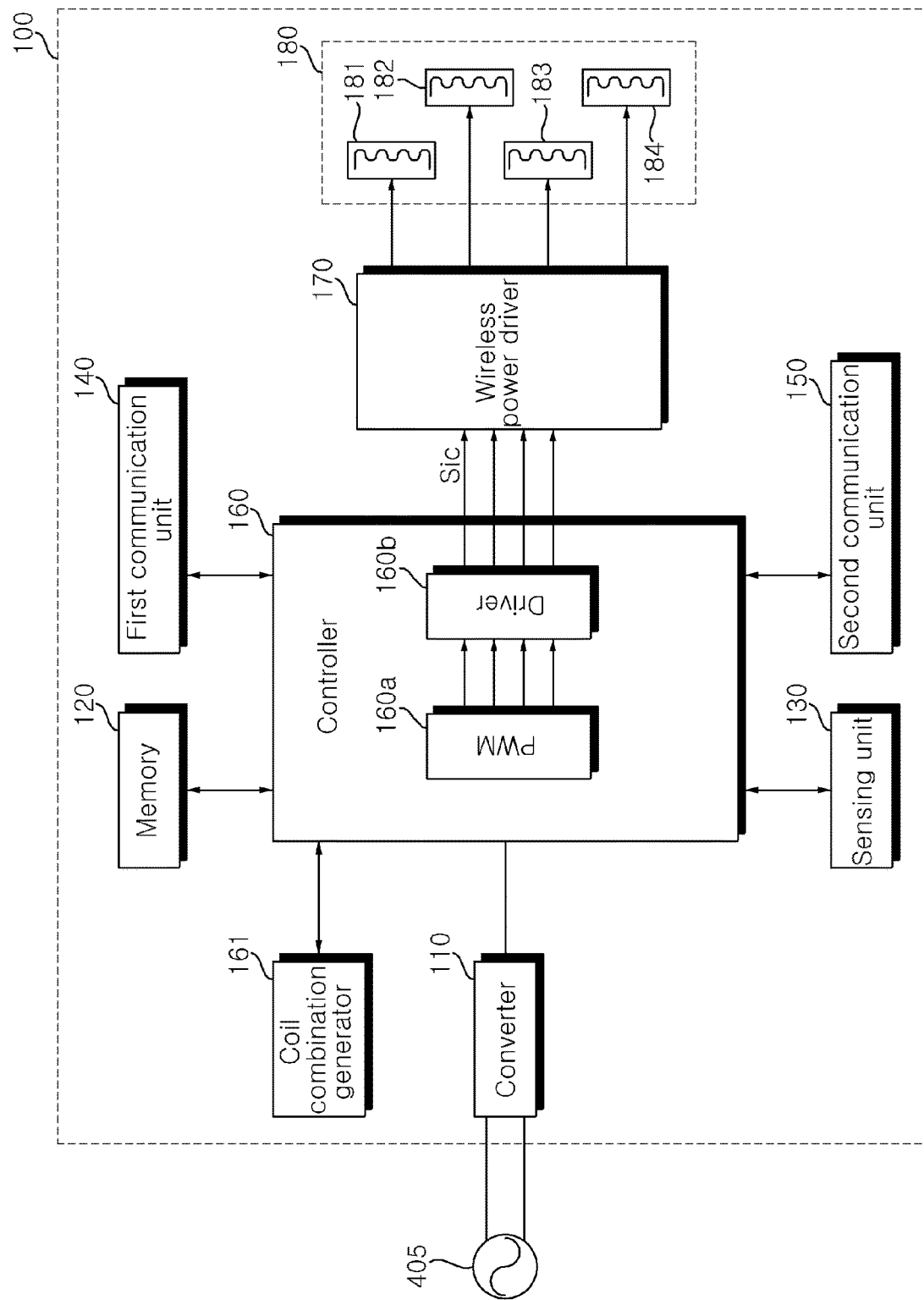
[FIG. 2]

[FIG. 3]
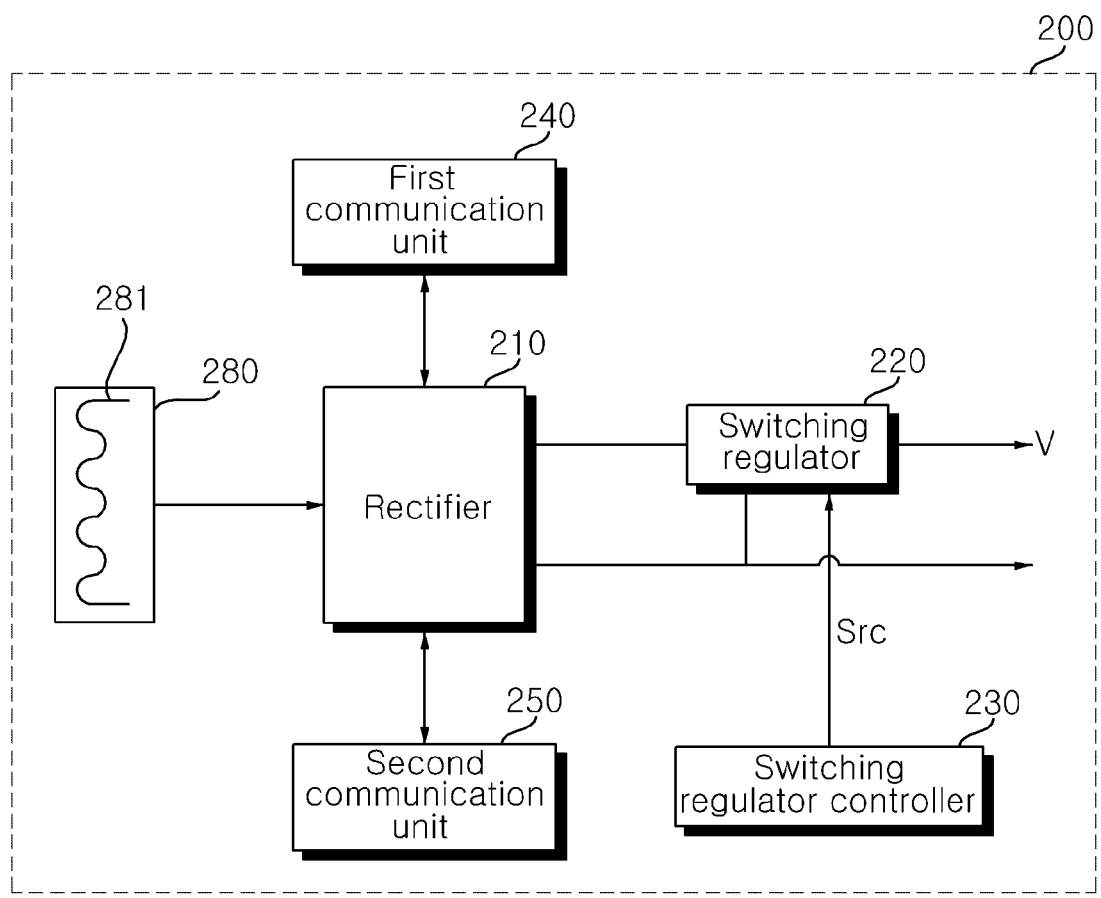

[FIG. 4]
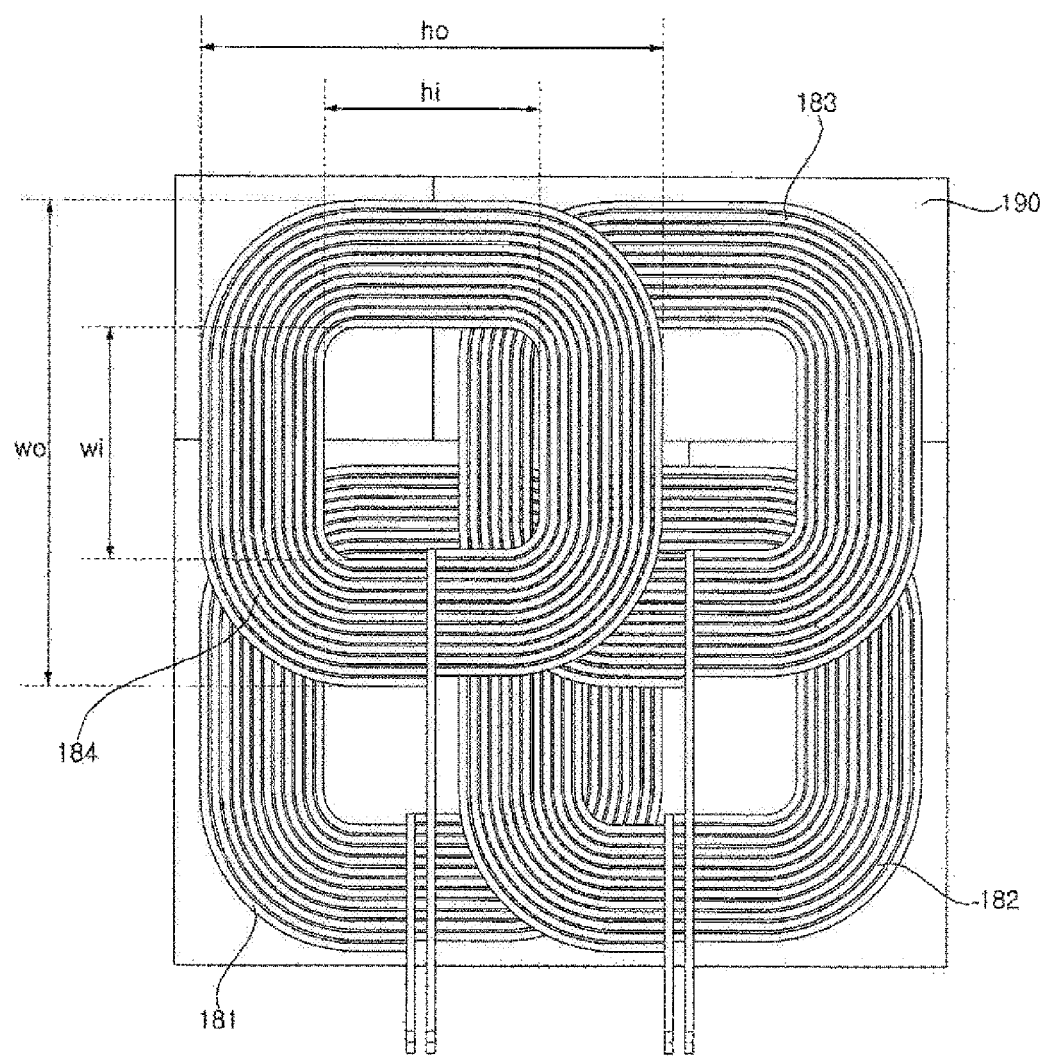

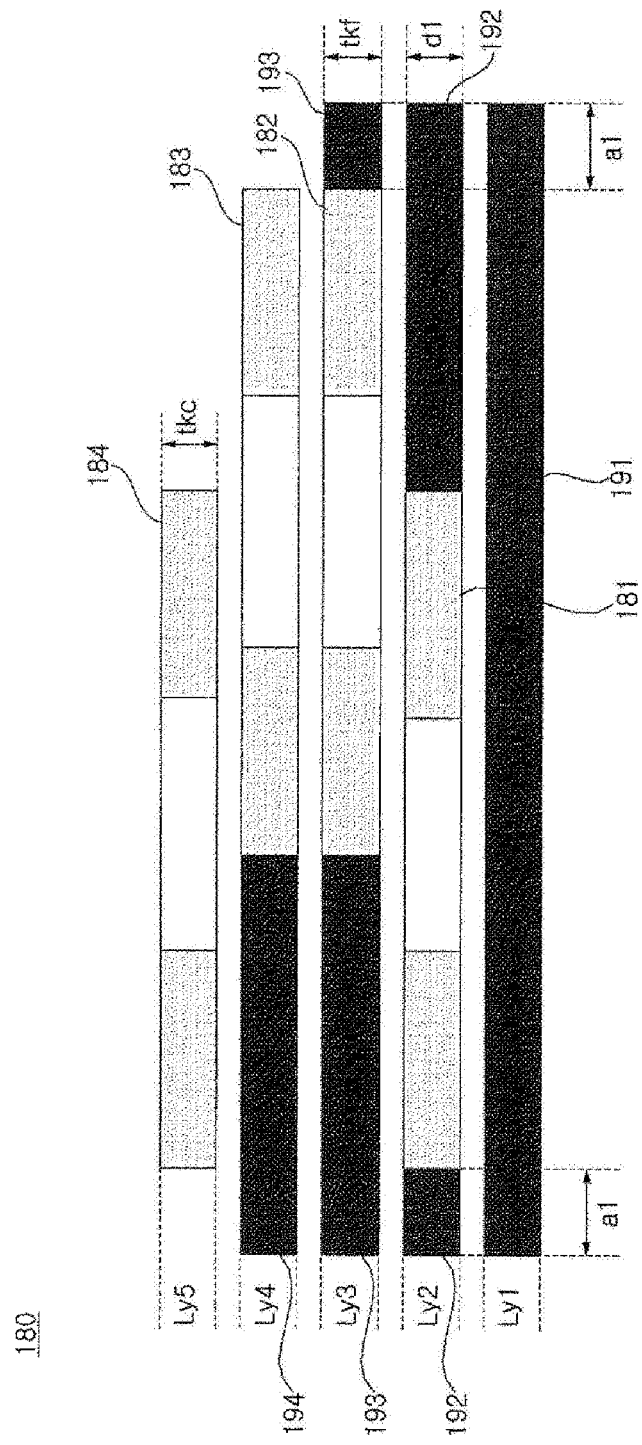
[FIG. 5]

[FIG. 6]
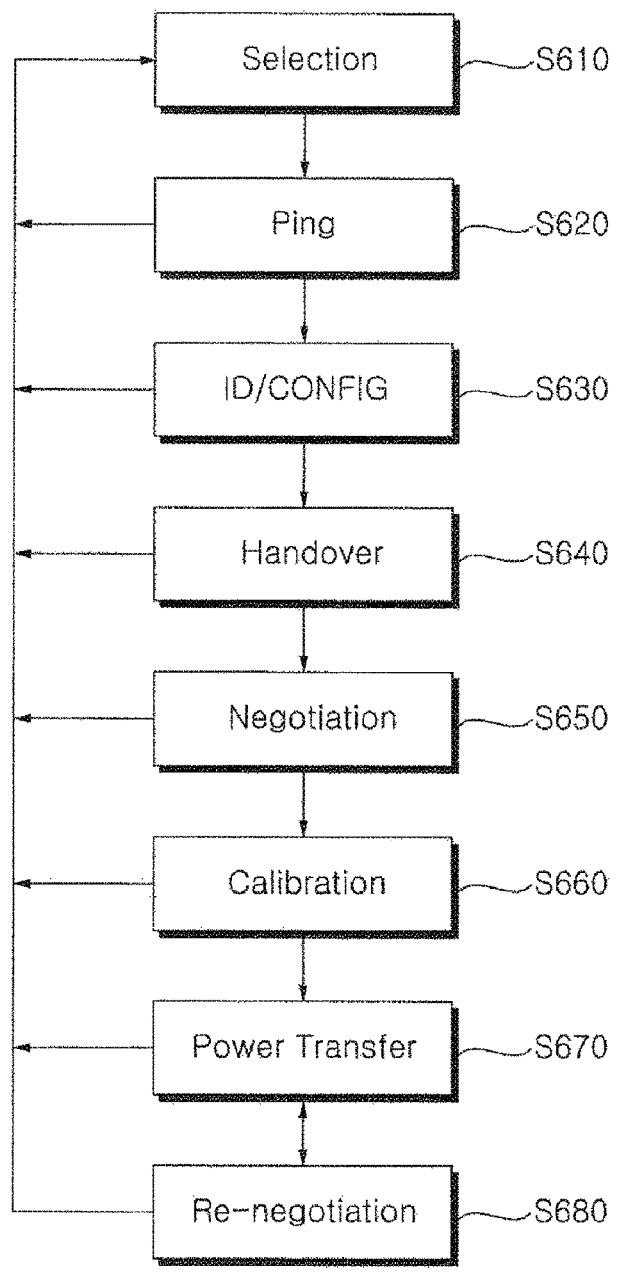

[FIG. 7]
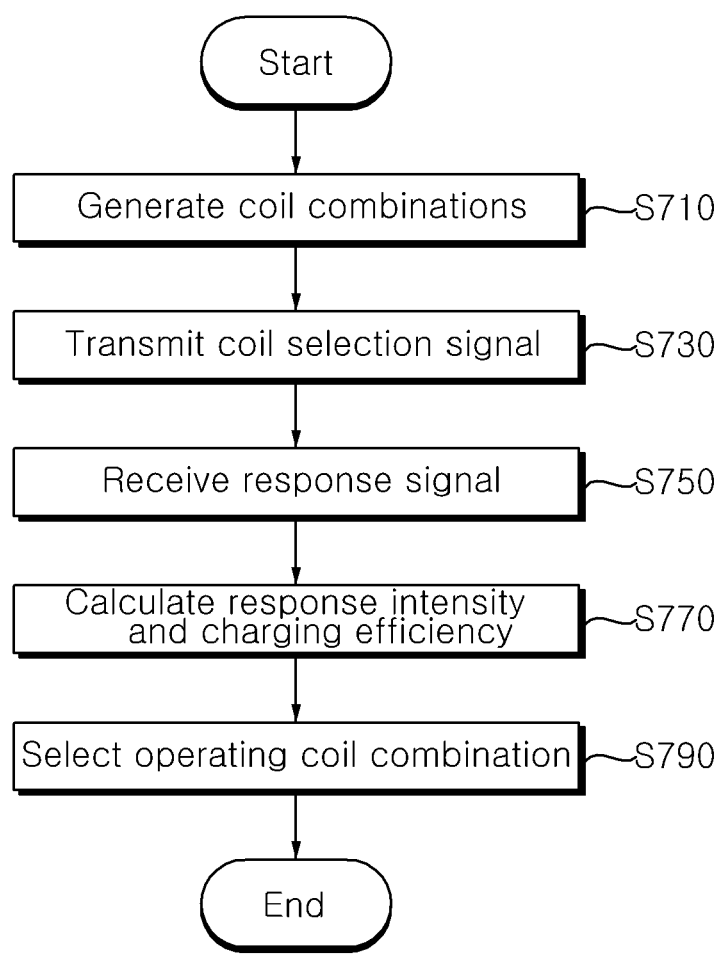

[FIG. 8]
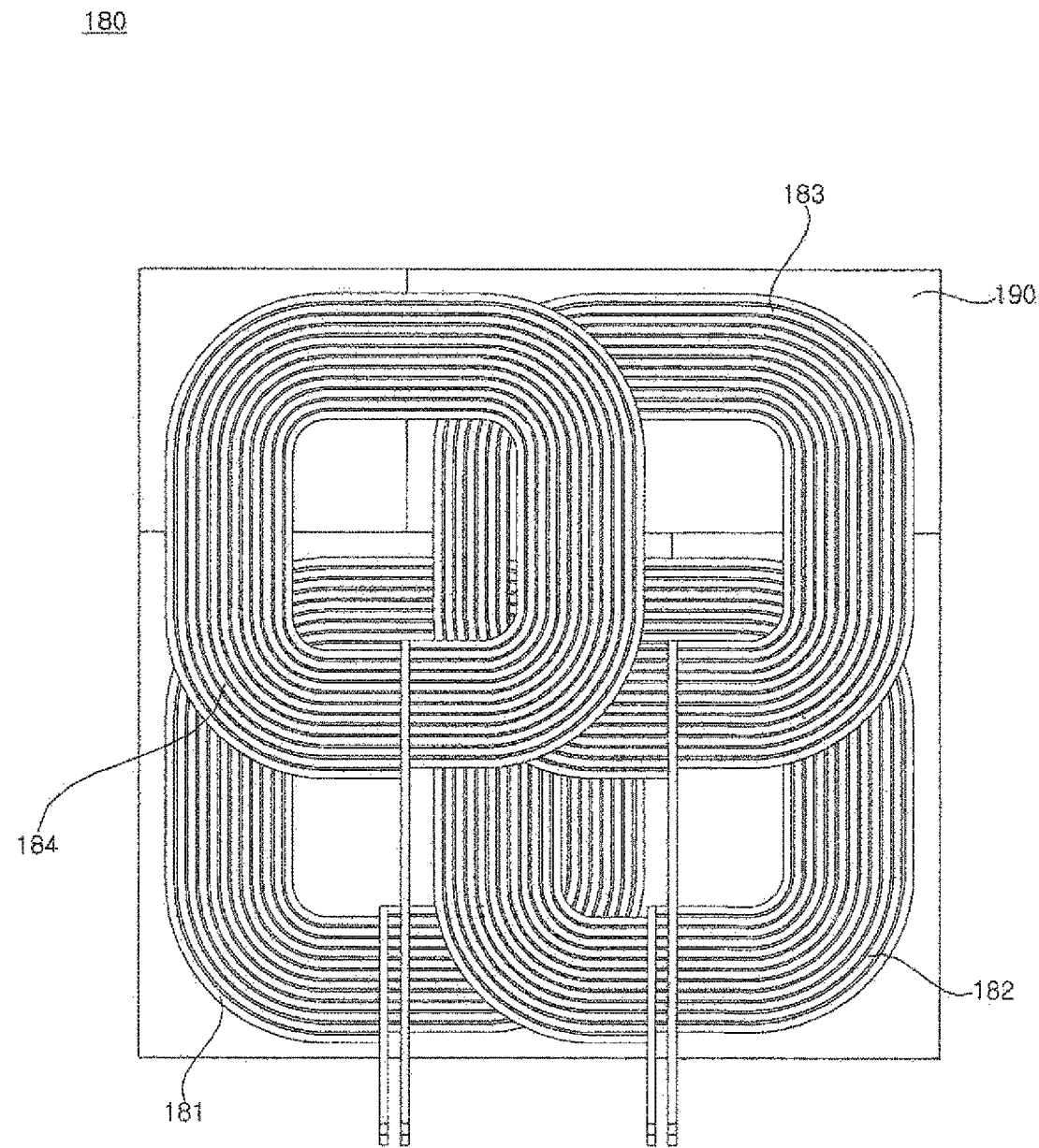

[FIG. 9]
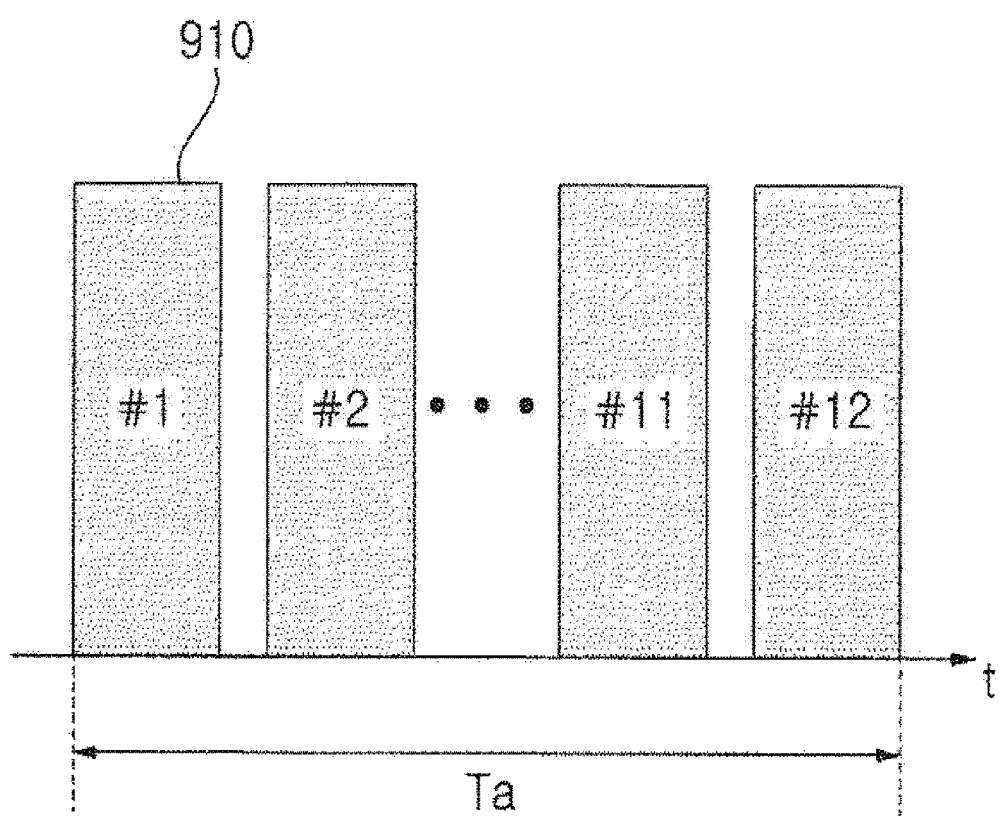

[FIG. 10]
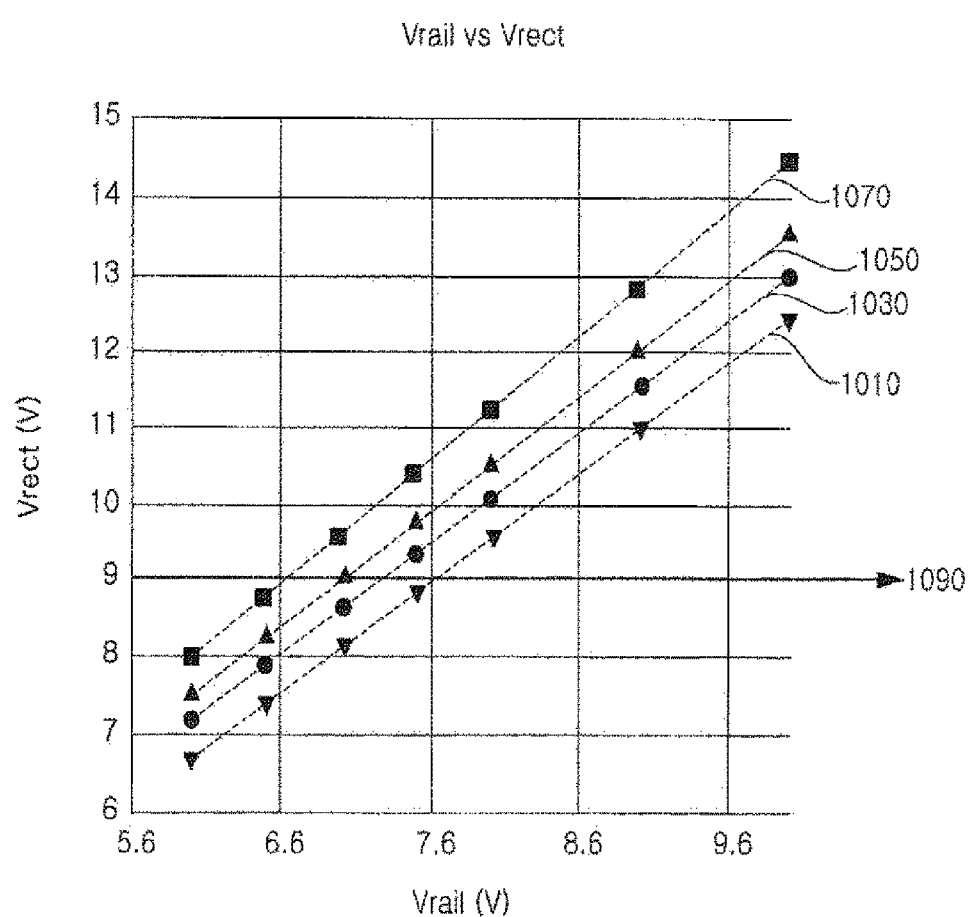

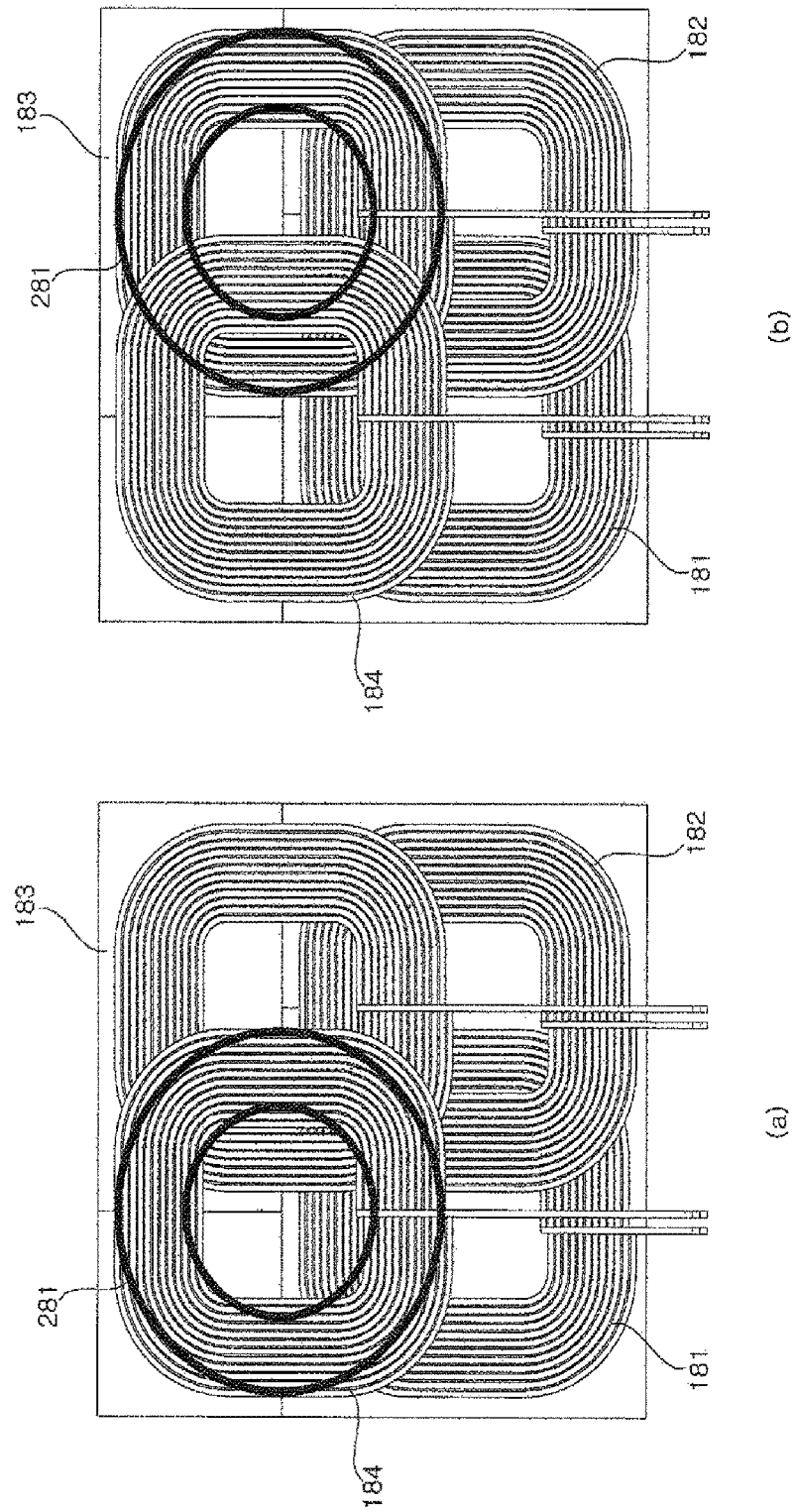
[FIG. 11]

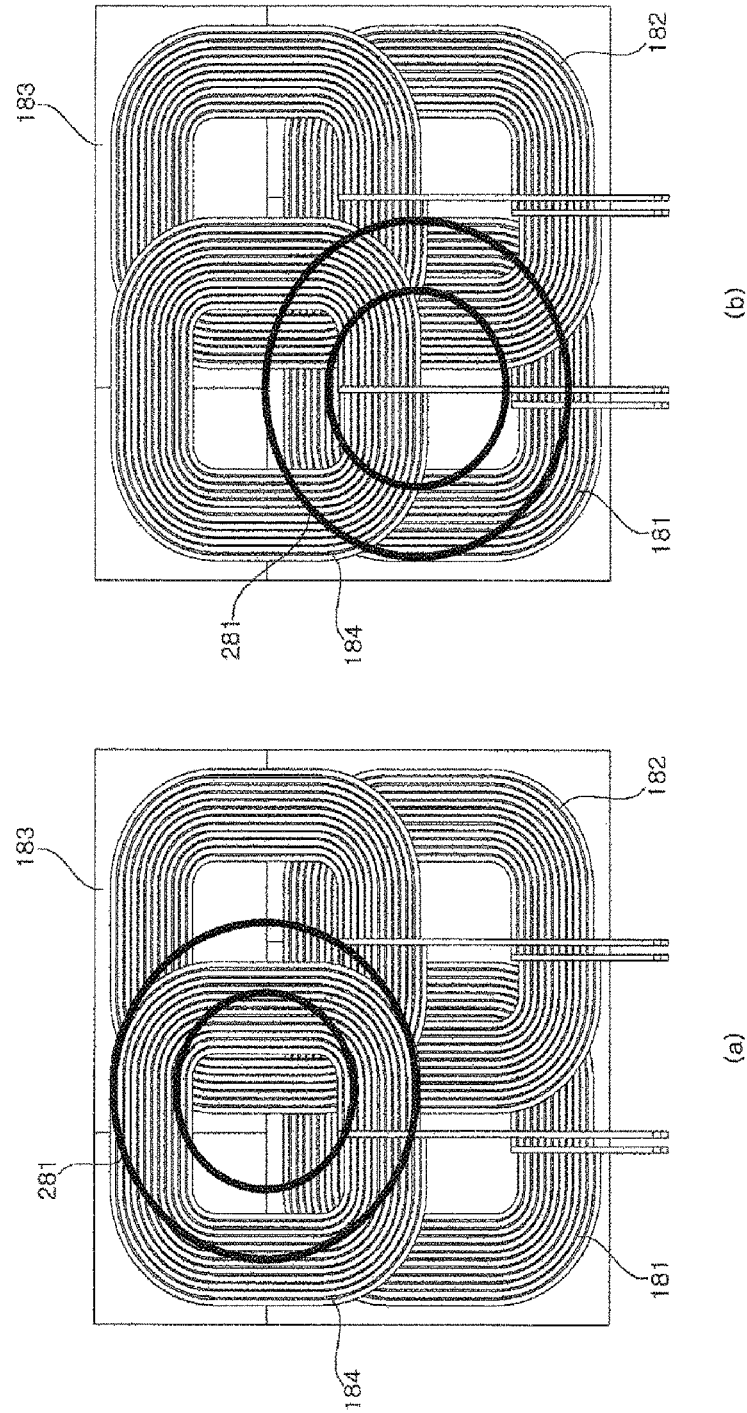
[FIG. 12]

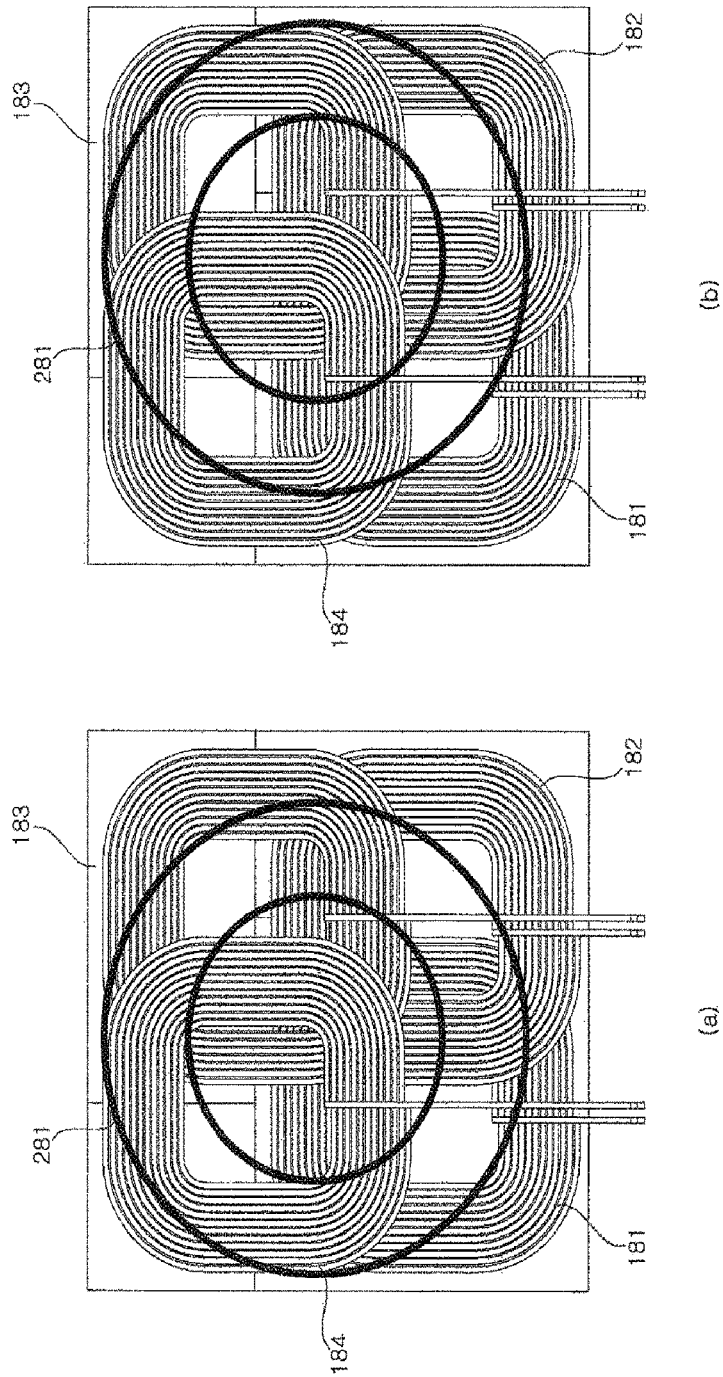

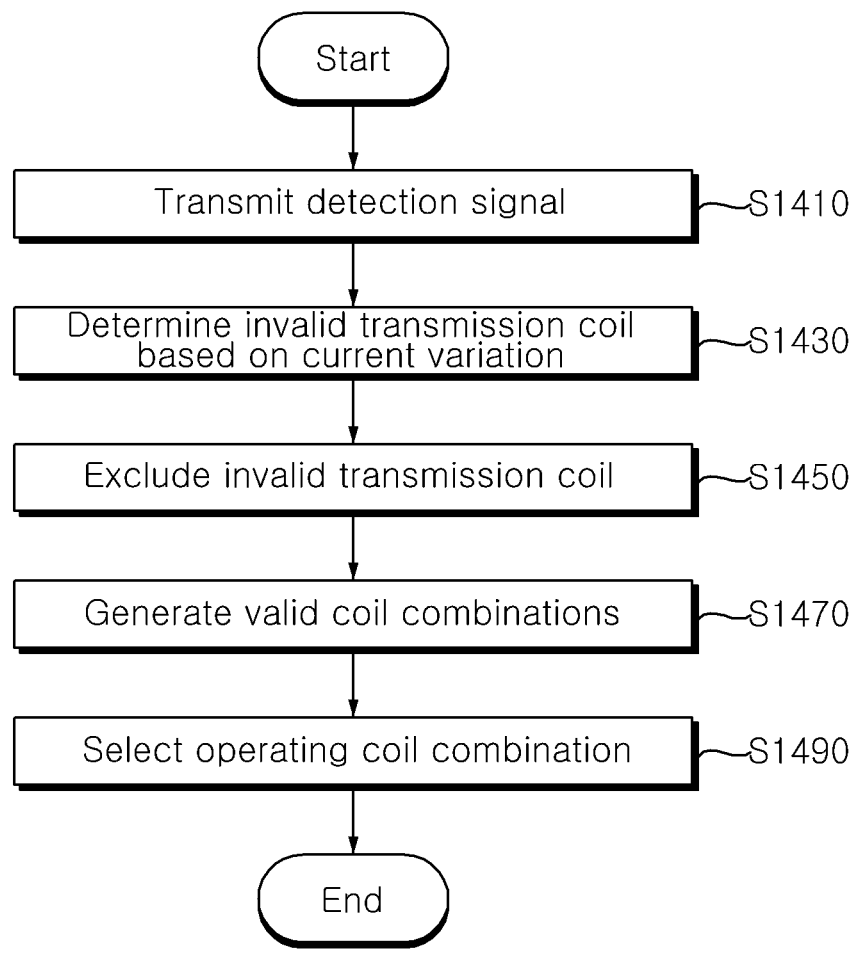
[FIG. 14]

[FIG. 15]
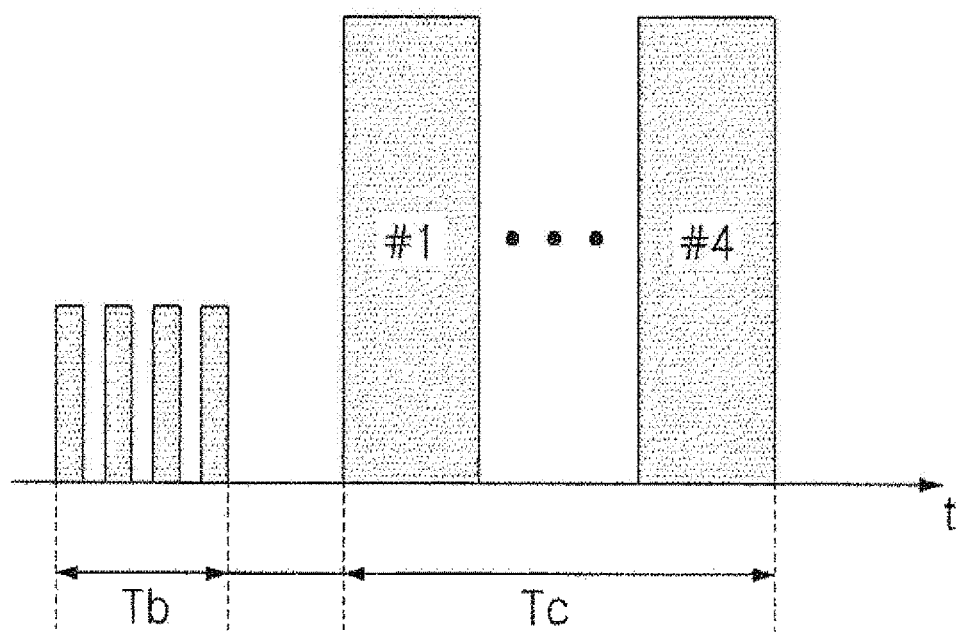

[FIG. 16]
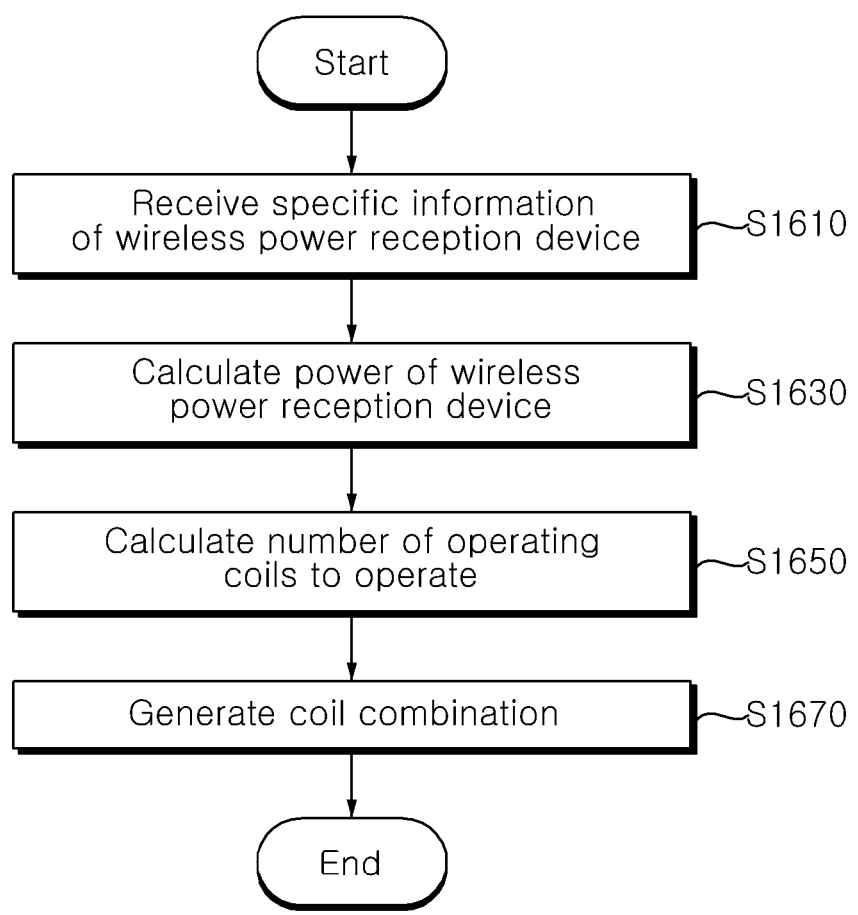

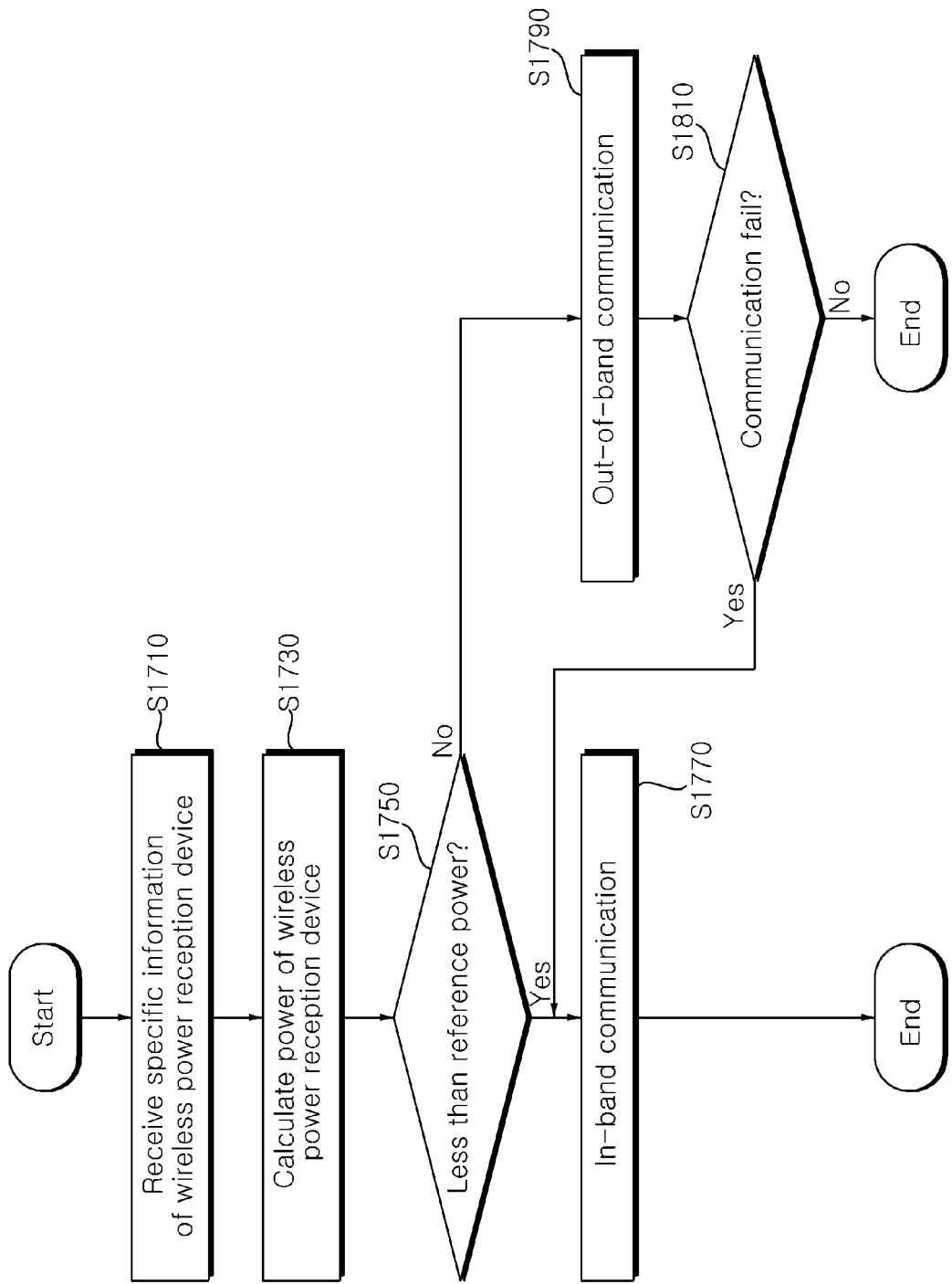
[FIG. 17]

WIRELESS POWER TRANSMISSION DEVICE

CROSS REFERENCE TO RELATED APPLICATIONS

This application is the National Phase of PCT International Application No. PCT/KR2019/013014, filed on Oct. 4, 2019, which claims priority under 35 U.S.C. 119(a) to Patent Application Nos. 10-2018-0118250, 10-2018-0118251 and 10-2018-0118252 filed in the Republic of Korea all on Oct. 4, 2018, all of which are hereby expressly, incorporated by reference into the present application.

BACKGROUND OF THE DISCLOSURE

Field of the Disclosure

The present disclosure relates to a wireless power transmission device and, more specifically, to a wireless power transmission device capable of extending a charging area of a wireless power reception device and improving charging efficiency.

Related Art

There is a terminal supply method of connecting a physical cable or wire to a commercial power supply and an electronic device as a method for supplying power to the electronic device. In such a terminal supply method, cables or wires occupy a considerable space and they are not easily arranged and have a risk of disconnection.

To solve such problems, research on a wireless power transmission method has recently been conducted.

A wireless power transmission system may include a wireless power transmission device that supplies power through a single coil or multiple coils and a wireless power reception device that receives the power wirelessly supplied from the wireless power transmission device and uses the power.

However, a conventional energy transfer method using a single coil has a problem that it cannot be used for wireless power reception devices of various sizes because a charging area is restrictive.

Accordingly, a method capable of extending a charging area of a wireless charging device and improving charging efficiency is required.

"Wireless power transmission device and method" disclosed in KR 10-2014-0135051 provides a method of pinging a plurality of primary coils to select a primary coil with a high signal intensity as an operating coil.

However, in the aforementioned "wireless power transmission device and method," a primary coil that has higher charging efficiency while having a low signal intensity may not be selected as an operating coil because a primary coil is selected based on signal intensity only.

Furthermore, although the "wireless power transmission device and method" disclosed in KR 10-2014-0135051 ping all primary coils to select an operating coil, there are problems that it is inefficient to output a coil selection signal to a coil combination that is not obviously generated as an operating coil combination and a charging time also increases.

Meanwhile, "operating method of wireless power transmission device" disclosed in KR 10-2015-0096954 provides a configuration in which one of a plurality of transmission coils is selected according to power of a wireless power reception device which is determined from an RXID of the wireless power reception device.

However, there are problems that not only operating coils but also the number of operating coils need to be changed in response to a power level of the wireless power reception device, and noise caused by modulation increases and communication reliability decreases if a communication method is not changed in response to a power level.

SUMMARY

An object of the present disclosure is to provide a wireless power transmission device capable of extending a high-efficiency charging area in partially overlapping multiple coils.

Another object of the present disclosure is to provide a wireless power transmission device capable of efficiently selecting an operating coil to be used for wireless power from multiple coils.

Another object of the present disclosure is to provide a wireless power transmission device capable of efficiently charging wireless power reception devices with various power levels and reducing a charging time in multiple coils.

To accomplish the aforementioned objects, a wireless power transmission device according to an embodiment of the present disclosure includes a coil part including a plurality of partially overlapping coils, a coil combination generator for generating coil combinations including at least one of the plurality of coils, and a controller for transmitting a coil selection signal through the coil combinations and selecting an operating coil combination from the coil combinations based on the intensity of a response signal for the coil selection signal and the charging efficiency of a wireless power reception device.

The wireless power transmission device according to an embodiment of the present disclosure selects an operation coil to be used for wireless power by applying a weight increasing in proportion to charging efficiency to a response signal intensity of a wireless power reception device. Accordingly, it is possible to prevent a case in which an operation coil with high charging efficiency is not selected.

In addition, the wireless power transmission device does not output a coil selection signal to a coil combination that is not obviously generated as an operating coil combination based on variation in a current with respect to an object detection signal. Accordingly, an operating coil combination can be efficiently selected.

Furthermore, since the wireless power transmission device does not output an unnecessary coil selection signal, a time taken to select an operating coil is reduced and, consequently, a total charging time is decreased.

Moreover, since the wireless power transmission device does not output an unnecessary coil selection signal, a total number of coil selection signal transmissions is reduced, and thus total power consumption of the wireless power transmission device 100 can also be reduced.

In addition, the wireless power transmission device can vary the number of operating coils to be operated in response to the power of a wireless power reception device to charge the wireless power reception device more efficiently.

Furthermore, since the wireless power transmission device can vary the number of operating coils to be operated in response to the power of a wireless power reception device, the wireless power transmission device has compatibility with wireless power reception devices with various power levels.

In addition, since the wireless power transmission device changes a communication method to out-of-band communication when charging a large-capacity wireless power reception device, a high-frequency noise problem generated when a large-capacity data packet is modulated in in-band communication can be solved.

Moreover, since the wireless power transmission device changes a communication method to out-of-band communication when charging a large-capacity wireless power reception device, a transmission speed is not reduced even when a large-capacity data packet is transmitted and communication reliability can be improved.

Furthermore, since the wireless power transmission device charges a wireless power reception device using a coil combination instead of a single coil, a charging time is reduced.

In addition, since the wireless power transmission device charges a wireless power reception device through a plurality of coils, a charging area is extended as compared to a case in which a single coil is used.

Further, the wireless power transmission device can improve user convenience since the charging area is extended.

Moreover, since the plurality of coils in the wireless power transmission device are partially overlap to reduce a dead zone, a wireless power reception device can be charged at any position on a charging surface.

Furthermore, in the wireless power transmission device, factory calibration can be performed such that transmission intensities of coil selection signals respectively transmitted from the plurality of coils are equal on the charging surface, and thus an operating coil combination can be selected more accurately.

In addition, the wireless power transmission device sets a main coil and an auxiliary coil in operating coils based on a response signal intensity and communicates with a wireless power reception device only through the main coil so that it can stably communicate with the wireless power reception device without signal interference caused by the auxiliary coil.

BRIEF DESCRIPTION OF THE DRAWINGS

FIG. 1 is an exemplary internal block diagram of a wireless power system according to an embodiment of the present disclosure.

FIG. 2 is an interval block diagram of a wireless power transmission device in the wireless power system of FIG. 1.

FIG. 3 is an internal block diagram of a wireless power reception device in the wireless power system of FIG. 1.

FIG. 4 is a diagram for describing a structure of a coil part of FIG. 2.

FIG. 5 is a perspective view illustrating a layered structure of the coil part of FIG. 4.

FIG. 6 is a flowchart for describing a wireless power transmission method according to an embodiment of the present disclosure.

FIG. 7 is a flowchart for describing a method of selecting an operating coil combination according to an embodiment of the present disclosure.

FIG. 8 is a diagram for describing a method of generating a coil combination.

FIG. 9 is a diagram illustrating an example of a coil selection signal according to the coil combination of FIG. 8.

FIG. 10 is a diagram for describing a factory calibration level of the coil selection signal of FIG. 9.

FIG. 11 is a diagram for describing a method of selecting the operating coil combination of FIG. 8.

FIG. 12 is a diagram for describing a method of selecting the operating coil combination of FIG. 8.

FIG. 13 is a diagram for describing a method of selecting the operating coil combination of FIG. 8.

FIG. 14 is a flowchart for describing a method of selecting an operating coil combination according to another embodiment of the present disclosure.

FIG. 15 is a diagram referred to description of FIG. 14.

FIG. 16 is a flowchart for describing a method of selecting an operating coil combination according to another embodiment of the present disclosure.

FIG. 17 is a flowchart for describing a method of selecting an operating coil combination according to another embodiment of the present disclosure.

DESCRIPTION OF EXEMPLARY EMBODIMENTS

Hereinafter, the present disclosure will be described in more detail with reference to the drawings.

The terms "module" and "unit or part" used to signify components in the following description are used in consideration of only facilitation of preparation of the present specification and thus they should not be considered as having specific meanings or roles. Accordingly, the terms "module" and "unit or part" may be used interchangeably.

The terms such as "first" and "second" may be used to distinguish any one element from another element. However, these elements are not limited by the terms. The terms are used only to distinguish one element from another element.

In the specification of the present disclosure, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

FIG. 1 is an exemplary internal block diagram of a wireless power system according to an embodiment of the present disclosure.

Referring to the figure, the wireless power system 10 may include a wireless power transmission device 100 that wirelessly transfers power and a wireless power reception device 200 that receives the wirelessly transferred power.

The wireless power transmission device 100 may change magnetic fields of a coil 181 to transfer power to the wireless power reception device 200 using a magnetic induction phenomenon in which current is induced in a reception coil 281. Here, the wireless power transmission device 100 and the wireless power reception device 200 may use an electromagnetic induction wireless charging method defined in the wireless power consortium (WPC).

The wireless power transmission device 100 can wirelessly transfer power to charge the wireless power reception device 200.

According to an embodiment, a single wireless power transmission device 100 may charge a plurality of wireless power reception devices 200. Here, the wireless power transmission device 100 may distributively transfer power to the wireless power reception device 200 in a time division manner. However, the present disclosure is not limited thereto and the wireless power transmission device 100 may distributively transfer power to a plurality of power transmission devices 200 using different frequency bands allocated to the wireless power reception devices 200. The number of wireless power reception devices 200 that can be connected to the single wireless power transmission device 100 may be adaptively determined in consideration of electric energy required for each wireless power reception device 200, available electric power of the wireless power transmission device 100, and the like.

In another embodiment, a plurality of wireless power transmission devices 100 may charge at least one wireless power reception device 200. In this case, the at least one wireless power reception device 200 can be simultaneously connected to the plurality of wireless power transmission devices 100 and can simultaneously receive power from the connected wireless power transmission devices 100 to be charged. Here, the number of wireless power transmission devices 100 may be adaptively determined in consideration of electric energy required for each wireless power reception device 200, available electric power of the wireless power transmission devices 100, and the like.

The wireless power reception device 200 can receive the power transferred from the wireless power transmission device 100.

For example, the wireless power reception device 200 may be a mobile phone, a laptop computer, a wearable device such as a smart watch, personal digital assistants (PDA), a portable multimedia player (PMP), a navigation system, an MP3 player, an electric toothbrush, a lighting device, or a remote controller. However, the present disclosure is not limited thereto and the wireless power reception device 200 may be any battery-chargeable electronic device.

The wireless power transmission device 100 and the wireless power reception device 200 can perform two-way communication. According to an embodiment, the wireless power transmission device 100 and the wireless power reception device 200 may perform one-way communication or half duplex communication.

Here, a communication method may be an in-band communication method using the same frequency band and/or an out-of-band communication method using different frequency bands.

For example, information exchanged between the wireless power transmission device 100 and the wireless power reception device 200 may include state information, information on amounts of power used, battery charge information, battery output voltage/current information, and control information of both devices, etc.

FIG. 2 is an internal block diagram of the wireless power transmission device in the wireless power system of FIG. 1.

Referring to the figure, the wireless power transmission device 100 may include a converter 110 that converts commercial AC power 405 into DC power, a wireless power driver 170 that converts the DC power into AC power, and a coil part 180 that wirelessly transfers power using the converted AC power.

In addition, the wireless power transmission device 100 may further include a controller 160 that controls internal components of the wireless power transmission device 100 for power transfer and communication, a coil combination generator 161 that generates coil combinations including at least one of a plurality of coils 181 to 184, a first communication unit 140 and a second communication unit that communicate with the wireless power reception device 200 through a predetermined communication method, a sensing unit 130 that senses a current flowing through the wireless power transmission device 100, a temperature of the coil part 180, and the like, and a memory 120 that stores a control program for driving the wireless power transmission device 100, and the like.

The wireless power transmission device 100 operates by DC power, and this DC power may be supplied from the converter 110 that converts commercial AC power into DC power.

The converter 110 can convert the commercial AC power 405 into DC power and output the DC power. Although the commercial AC power 405 is illustrated as single-phase AC power in the figure, it may be three-phase AC power. The internal configuration of the converter 110 may vary according to the type of the commercial AC power 405.

Further, the converter 110 may be composed of diodes and the like without a switching element and may perform a rectification operation without an additional switching operation.

For example, four diodes may be used in the form of a bridge in the case of single-phase AC power, and six diodes may be used in the form of a bridge in the case of three-phase AC power.

For example, as the converter 110, a half bridge type converter in which two switching elements and four diodes are connected may be used, and six switching elements and six diodes may be used in the case of three-phase AC power.

The controller 160 can control the wireless power driver 170 to wirelessly transfer power when the DC power from the converter 110 is supplied to the wireless power driver 170 at the time of wireless power transmission. Here, the wireless power driver 170 can convert the DC power into AC power for wireless power transmission.

Specifically, the controller 160 may include a PWM generator 160a that generates a PWM signal and a driver 160b that generates and outputs a drive signal Sic based on the PWM signal.

The controller 160 can determine a duty of the PWM signal based on the amount of power transmission, a current flowing through the wireless power driver 170, and the like. The PWM driver 160a can generate the PWM signal based on the duty of the PWM signal. The driver 160b can output the drive signal Sic for driving the wireless power driver 170 based on the PWM signal.

The wireless power driver 170 may include at least one switching element (not shown) for converting DC power into AC power. For example, if the switching element is an IBGT, a gate driving signal may be output from the driver 160b and input to a gate terminal of the switching element. Further, the switching element can perform a switching operation according to the gate driving signal. The DC power can be converted into AC power by the switching operation of the switching element and output to the coil part 180.

According to an embodiment, the wireless power driver 170 may be included as a component in the controller 160.

The coil part 180 may include a plurality of coils 181 to 184 (181 when they need not be distinguished). The plurality of coils 181 may partially overlap.

The coil part 180 can wirelessly transfer power to the wireless power reception device 200 through a coil combination selected from the plurality of coils 181.

The plurality of coils 181 may be called transmission coils to be distinguished from a reception coil 281 of FIG. 3.

The coil part 180 may further include a shielding member (190 of FIG. 4) that is provided on one side of the plurality of coils 181 and shields leaking magnetic fields.

The structure of the coil part 180 will be described in more detail below with reference to FIG. 4.

The coil combination generator 161 can generate coil combinations including at least one of the plurality of coils 181.

The first communication unit 140 can communicate with the wireless power reception device 200 through a first communication method. The first communication unit 140 can perform predetermined signal processing on state information, power control information, and the like regarding the wireless power transmission device 200, transfer the processed information to the wireless power reception device 200, receive state information, information on the amount of power used, charging efficiency information, and the like regarding the wireless power reception device 200, perform predetermined signal processing thereon, and then transfer the processed information to the controller 160.

The second communication unit 150 can communicate with the wireless power reception device 200 through a second communication method different from the first communication method. The second communication unit 140 can also perform predetermined signal processing on state information, power control information, and the like regarding the wireless power transmission device 200, transfer the processed information to the wireless power reception device 200, receive state information, information on the amount of power used, charging efficiency information, and the like regarding the wireless power reception device 200, perform predetermined signal processing thereon, and then transfer the processed information to the controller 160.

The first communication unit 140 and the second communication unit 150 may further include a modulator/demodulator (not shown) for modulating/demodulating a data signal transmitted from the wireless power transmission device 100 and a data signal received from the wireless power reception device 200.

In addition, the first communication unit 140 and the second transmission unit 150 may further include a filter unit (not shown) for filtering a data signal from the wireless power reception device 200. Here, the filter unit (not shown) may include a band pass filter (BPF).

Meanwhile, the first communication method may be an in-band communication method using the same frequency band as that of the wireless power reception device 200, and the second communication method may be an out-of-band communication method using a frequency band different from that of the wireless power reception device 200.

The wireless power transmission device 100 can change the communication methods based on power information of the wireless power reception device 200.

Change of the communication methods of the wireless power transmission device 100 will be described in detail with reference to FIG. 17.

The sensing unit 130 can measure the voltage, current, etc. of power transferred to the wireless power reception device 200 and provide the measured values to the controller 160. Further, the sensing unit 130 may measure the temperature of the plurality of coils 181 or the shielding member 190 and provide the measurement result to the controller 160 in order to determine whether the wireless power transmission device 100 is overheated.

Here, the controller 160 may stop wireless power transmission to the wireless power reception device 200 based on the voltage, current and temperature information measured by the sensing unit 130.

The memory 120 may store a program for operation of the power transmission device 100.

In addition, the memory 120 may store transmission intensities of object detection signals respectively transmitted from the plurality of coils to detect an object on a charging surface.

Further, the memory 120 may store transmission intensities of coil selection signals respectively transmitted from the plurality of coils.

Here, the transmission intensities of the object detection signals and the transmission intensities of the coil selection signals may be factory-calibrated signals.

Specifically, since the plurality of coils 181 to 184 of the present disclosure are layered and partially overlap, as shown in FIG. 4, when the coils transmit object detection signals and coil selection signals with the same transmission intensity, the intensities of the object detection signals and the coil selection signals on the charging surface on which the wireless power reception device 20 is disposed may be different.

Such differences between the intensities of the object detection signals and the coil selection signals on the charging surface may cause an error in object detection and operating coil combination.

To solve this problem, the present disclosure can compensate for distances between the coils and the charging surface on which the wireless power reception device 200 is disposed to set the transmission intensities of the object detection signals and the transmission intensities of the coil selection signals For example, a transmission intensity of an object detection signal and a transmission intensity of a coil selection signal may be set such that they increase as a distance between the corresponding coil and the charging surface increases.

For example, a transmission intensity of an object detection signal and a transmission intensity of a coil selection signal may be set such that they increase as a distance between the corresponding coil and the charging surface increases.

Accordingly, the intensities of object detection signals on the charging surface on which the wireless power reception device 200 is disposed may be identical. Further, the intensities of coil selection signals on the charging surface may be identical.

Meanwhile, compensated transmission intensities of the object detection signals and the coil selection signals may be stored in the memory 120 as factory-calibrated values.

The controller 160 can control the overall operation of the wireless power transmission device 100.

The controller 160 can select an operating coil combination to be used for wireless power transmission from coil combinations generated by the coil combination generator 161 and charge the wireless power reception device 200 through the selected operating coil combination.

Specifically, the controller 160 can transmit a coil selection signal through coils included the coil combinations and receive a response signal for coil selection.

In addition, the controller 160 can select an operating coil combination to be used for wireless power from the coil combinations based on the intensity of the response signal and charging efficiency of the wireless power reception device 200.

The controller 160 can wirelessly transfer power to the wireless power reception device 200 through the operating coil combination.

The coil combination generator 161 can transmit an object detection signal through the plurality of coils 181 and determine an invalid coil based on current variation with respect to the object detection signal.

Further, the coil combination generator 161 can generate valid coil combinations by excluding the invalid coil from the plurality of coils 181.

Here, the controller 160 can select an operating coil combination to be used for wireless power from the valid coil combinations.

The coil combination generator 161 may calculate power of the wireless power reception device 200 based on specific information of the wireless power reception device 200 received through the coil part 180 and calculate the number of operating coils based on the calculated power of the wireless power reception device 200.

Further, the coil combination generator 161 can generate coil combinations depending on the number of operating coils.

On the other hand, the coil combination generator 161 may be a component included in the controller 160, differently from the configuration of FIG. 2. That is, the coil combination generator 161 may be implemented as a component of the controller 160.

A method of selecting an operating coil combination will be described in more detail with reference to FIGS. 7 to 13, a valid coil combination will be described in more detail with reference to FIGS. 14 and 15, and generation of coil combinations in response to the power of the wireless power reception device 200 will be described in more detail with reference to FIG. 17.

FIG. 3 is an internal block diagram of the wireless power reception device in the wireless power system of FIG. 1.

Referring to the figure, the wireless power reception device 200 may include a power receiver 280 that receives wireless power from the wireless power transmission device 100, a rectifier 210 that rectifies the received wireless power, a switching regulator 220 that stabilizes the rectified wireless power, and a switching regulator controller 230 that controls the switching regulator 220 to output operating power to a load.

In addition, the wireless power reception device 200 may further include a first communication unit 240 and a second communication unit 150 for communicating with the wireless power transmission device 100.

The power receiver 280 can receive wireless power transferred from the coil part 180. To this end, the power receiver 280 can include the reception coil 281.

An induced electromotive force can be generated in the reception coil 281 according to magnetic fields generated from any one of the plurality of coils 181 to 184. Wireless power according to the induced electromotive force can be directly supplied to a load using wireless power through the rectifier 210 and the switching regulator 220 which will be described later or used to charge a battery when the load is the battery.

The reception coil 281 may be formed in a conductive thin film pattern on a printed circuit board (PCB). The reception coil 281 may be printed on a reception pad (not shown) in a closed loop shape. The reception coil 281 may have a winding shape such that it has a polarity in the same direction.

The rectifier 210 can rectify wireless power received through the reception coil 281 at the time of wireless power reception from the wireless power transmission device 100. The rectifier 210 may include at least one diode element (not shown).

The switching regulator 220 can output the rectified wireless power as charging power V supplied to a battery according to control of the switching regulator controller 230.

The switching regulator controller 230 can control the switching regulator such that to output the charging power V by applying a regulator control signal Src to the switching regulator.

Further, the switching regulator 220 can perform DC-DC conversion according to the regulator control signal Src of the switching regulator controller 230 to control an output voltage. The switching regulator 220 can control the output voltage based on the regulator control signal Src to output the charging power V having a voltage of a designated magnitude.

Meanwhile, the wireless power reception device 200 does not include an additional microprocessor, and the switching regulator can be controlled by the switching regulator controller 230 when the rectified charging power V is output as a voltage of a predetermined magnitude is output by the switching regulator. When the wireless power reception device 200 does not include a microprocessor, a hardware configuration is simplified and power consumption is reduced.

FIG. 4 is a diagram for describing a structure of the coil part of FIG. 2 and FIG. 5 is a perspective view illustrating a layered structure of the coil part of FIG. 4.

Referring to the figures, the coil part 180 according to an embodiment of the present disclosure may include first to fourth coils 181 to 184.

Since the coil part 180 is not a single large coil and includes the first to fourth coils 181 to 184, a degree of freedom of the charging surface can be improved and power efficiency reduction due to stray magnetic fields of a large coil can be prevented.

The first to fourth coils 181 to 184 may be arranged such that some areas thereof overlap. Specifically, some areas of the first coil 181 and the second coil 182 overlap, some areas of the second coil 182 and the third coil 183 overlap, and some areas of the third coil 183 and the fourth coil 184 overlap, as shown in FIG. 4.

Overlap areas of the first to fourth coils 181 to 184 can be set such that a dead zone where charging is impossible is minimized. Specifically, the overlap areas of the first to fourth coils 181 to 184 can be set such that a dead zone at the center of a charging area is minimized.

The first to fourth coils 181 to 184 may be manufactured in a predetermined outer length ho, inner length hi, outer width wo, inner width wi, thickness, and number of turns. Further, the first to fourth coils 181 to 184 may have the same outer length ho, inner length hi, outer width wo, and inner width wi.

Since the fourth coil 184 is disposed closest to the wireless power reception device 200, the inductance of the fourth coil 184 can be set to be less than the inductances of the first to third coils 181 to 183. This is for the purpose of causing the amount of power transmission and power efficiency on the surface of the coil part 180 to be uniform.

The first to fourth coils 181 to 184 may be disposed on the shielding member 190. The shielding member 190 may include ferrite composed of a combination of one or more elements selected from a group including cobalt (Co), iron (Fe), nickel (Ni), boron (B), silicon (Si), etc. The shielding member 190 is disposed on one side of the coils and can shield leaking matric fields and maximize directivity of magnetic fields.

The shielding member 190 may be formed in an area larger than an area in which the first to fourth coils 181 to 184 are disposed. For example, the shielding member 190 may be extended by a length al from the outer edges of the first to fourth coils 181 to 184 in the horizontal direction. Further, the shielding member 190 may be extended by a length al from the outer edges of the first to fourth coils 181 to 184 in the vertical direction.

Since the shielding member 190 is formed to be larger than the outer length of the first to fourth coils 181 to 184, leaking magnetic fields can be reduced and directivity of magnetic fields can be maximized.

On the other hand, since the first to fourth coils 181 to 184 are disposed such that some areas thereof overlap, a gap may be generated in a non-overlapping area. For example, only some areas of the first coil 181 and the second coil 182 overlap in FIG. 5, and thus a gap dl may be generated in a non-overlapping.

Due to such a gap, leaking magnetic fields of the second coil 182 are not shielded to cause decrease in the transmission efficiency of the wireless power transmission device 100 and dispersion of magnetic field directions. Further, the wireless power transmission device 100 can be easily damaged by external shocks due to such a gap.

To solve such problems, the first to fourth coils 181 to 184 and the shielding member 190 may be formed in a layered structure in the present disclosure.

More specifically, a base shielding member 191 may be disposed in a first layer Ly1 of the coil part 190.

The first coil 181 and a first shielding member 192 may be disposed on a second layer Ly2 above the base shielding member 191.

The second coil 182 partially overlapping the first coil 181 may be disposed on a third layer Ly3 above the first coil 181. Here, the first shielding member 192 disposed on the second layer Ly2 prevents a gap generated caused by the overlapping structure of the first coil 181 and the second coil 182.

In the same manner, a second shielding member 193 as well as the second coil 182 may be disposed on the third layer Ly3 of the coil part 180.

The third coil 183 partially overlapping the second coil 182 may be disposed on a fourth layer Ly4 above the second coil 182. Here, the second shielding member 193 disposed on the third layer Ly3 prevents a gap generated caused by the overlapping structure of the second coil 182 and the third coil 183.

Further, a third shielding member 194 as well as the third coil 183 may be disposed on the fourth layer Ly4, and the third shielding member 194 can prevent a gap generated caused by the overlapping structure of the third coil 183 and the fourth coil 184.

Moreover, it is desirable that the thickness tkf of the shielding member 190 be identical to the thickness tkc of the first to fourth coils 181 to 184 because the first to fourth coils 181 to 184 need to be attached to the shielding member 190 (including the base shielding member 191 and the first to third shielding members 192 to 194) without a gap therebetween.

Although the layers of the coil part 180 are separated in FIG. 5, this is for convenience of description and the layers of the coil part 180 may be in contact with each other.

Since the coil part 180 is disposed as shown in FIG. 5, gaps between the first to fourth coils 181 to 184 that partially overlap can be prevented and the first to fourth coils 181 to 184 can be prevented from detachment due to external shocks.

In addition, since the shielding member 190 is disposed on one side of each coil, leaking magnetic fields can be shielded and directions of magnetic fields can be further concentrated to improve transmission efficiency.

Furthermore, heat generated from multiple coils can be easily reduced because the shielding member 190 is disposed between coils.

The first to fourth coils 181 to 184 may be accommodated in a case which is not illustrated for convenience of description. The wireless power reception device 200 may be placed on one side of the case. When the wireless power reception device 200 is placed on one side of the case, one side of the case on which the wireless power reception device 200 is placed may be called a charging surface because the coil part 180 wirelessly transfers power to charge the wireless power reception device 200. The charging surface and an interface surface may be interchangeably used.

FIG. 6 is a flowchart illustrating a wireless power transmission method according to an embodiment of the present disclosure.

Referring to the figure, wireless power transmission may include a selection phase S610, a ping phase S620, an identification and configuration phase S630, a handover phase S640, a negotiation phase S650, a calibration phase S660, a power transfer phase S670, and a renegotiation phase S680.

First, the wireless power transmission device 100 can detect presence or absence of objects in a detection area in the selection phase S610.

To detect presence or absence of objects in the detection area, the wireless power transmission device 100 can detect presence or absence of an object in a charging area based on power variation (e.g., current variation in coils) with respect to an object detection signal. Here, the object detection signal may be an analog ping signal AP having very short pulses. The wireless power transmission device 100 can transmit the analog ping signal AP at predetermined intervals until an object on the charging surface is detected.

When the wireless power transmission device 100 includes a plurality of coils 181, the wireless power transmission device 100 can transmit the object detection signal through the plurality of coils 181 in a predetermined order and detect presence or absence of an object in a charging area based on current variations in the coils with respect to the object detection signal.

Specifically, when a current variation is equal to or greater than a predetermined current variation, the wireless power transmission device 100 can determine that an object is present in a charging area corresponding to the corresponding coil. Here, the corresponding coil may be called to as a valid coil used for a valid coil combination which will be described later.

The wireless power transmission device 100 can determine that any object is not present in the charging area corresponding to the corresponding coil when the current variation is less than the predetermined current variation. Here, the corresponding coil may be called an invalid coil that is not used for a valid coil combination.

Subsequently, when the wireless power transmission device 100 includes the plurality of coils 181, the wireless power transmission device 100 can select an operating coil combination to be used for wireless power in the selection phase S610.

Specifically, the wireless power transmission device 100 can generate coil combinations including at least one of the plurality of coils 181 in the selection phase S610.

In addition, the wireless power transmission device 100 can transmit a coil selection signal through the coils included in the coil combinations and receive a response signal for the coil selection signal.

Further, the wireless power transmission device 100 can select an operating coil combination to be used for wireless power based on the intensity of the response signal and the charging efficiency of a wireless power reception device.

Here, the coil selection signal may be a digital ping signal DP. The digital ping signal DP output in the selection phase S610 may be called a coil selection digital ping signal CSDP to be distinguished from a digital ping signal DP output in the ping phase S620 which will be described later.

A transmission intensity of the coil selection digital ping signal CSDP may be set by compensating for a distance between each coil and the charging surface on which the wireless power reception device 200 is disposed.

The coil selection digital ping signal CSDP may have characteristics such a frequency and a transmission intensity different from those of the digital ping signal DP in the ping phase S620. For example, the coil selection digital ping signal CSDP may have a transmission intensity set to be less than that of the digital ping signal DP to reduce power consumption of the wireless power transmission device 100.

The coil selection digital ping signal CSDP may be a signal specialized for efficient coil combination selection.

For example, the wireless power transmission device 100 may transmit the digital ping signal CSDP and receive specific information of the wireless power reception device 200. The wireless power transmission device 100 can calculate the power of the wireless power reception device 200 based on the specific information. The wireless power transmission device 100 can calculate the number of operating coils for efficient coil combination in consideration of the power of the wireless power reception device 200 and generate coil combinations depending on the calculated number of operating coils.

Subsequently, the wireless power transmission device 100 can measure a quality factor (Q factor) and/or a resonant frequency fo of the coil part 180 in order to determine presence or absence of a foreign substance in the charging area in the selection phase S610.

The wireless power transmission device 100 can determine presence or absence of a foreign substance in the charging area based on variations in the quality factor Q and/or the resonant frequency fo in the selection phase S610.

Alternatively, the wireless power transmission device 100 can determine presence or absence of a foreign substance in the charging area based on variations in the quality factor Q and/or the resonant frequency fo in the negotiation phase S650 which will be described later.

The foreign substance may be a metallic object including coin, a key, etc. and may be called a foreign object (FO).

The aforementioned detection area may refer to an area in which the wireless power transmission device 100 can transfer power. Further, the detection area may refer to an active area of a charging area, a charging surface or an interface surface on which the wireless power reception device 200 is charged.

In the selection phase S610, the wireless power transmission device 100 can continuously detect placement or removal of an object in the detection area. Further, the wireless power transmission device 100 can proceed to the ping phase S620 upon detection of an object in the detection area in the selection phase S610.

When the wireless power transmission device 100 detects an object, the wireless power transmission device 100 can awake the wireless power reception device 200 and transmit a reception device detection signal for identifying whether the detected object if the wireless power reception device 200 in the ping phase S620. Here, the reception device detection signal may be a digital ping signal DP.

The digital ping signal DP may have a duty set to be greater than that of the analog ping signal AP in order to attempt establishment of communication with the wireless power reception device 200.

The wireless power reception device 200 can modulate the digital ping signal DP and transmit the modulated digital ping signal DP to the wireless power transmission device 100.

The wireless power transmission device 100 can demodulate the modulated digital ping signal DP and obtain digital detection data corresponding to a response to the reception device detection signal from the demodulated digital ping signal DP.

The wireless power transmission device 100 can recognize the wireless power reception device 200 that is a power transfer target from the digital detection data.

For example, the detection data may include information on a degree of inductive coupling between the wireless power transmission device 100 and the wireless power reception device 200. The wireless power transmission device 100 can identify the wireless power reception device 200 based on the degree of inductive coupling between the wireless power transmission device 100 and the wireless power reception device 200.

Meanwhile, when the wireless power transmission device 100 includes the plurality of coils 181, transmission of the reception device detection signal and reception of the detection data in the aforementioned ping phase S620 can be performed through the operating coil combination selected in the selection phase S610.

When the wireless power transmission device 100 identifies the wireless power reception device 200 in the ping phase S620, the wireless power transmission device 100 can proceed to the identification and configuration phase S630.

Further, when the wireless power transmission device 100 does not receive digital detection data in the ping phase S620, the wireless power transmission device 100 can return to the selection phase S610.

In the identification and configuration phase S630, the wireless power transmission device 100 can receive identification information, power information, etc. transmitted from the wireless power reception device 200 and perform control such that power transfer is efficiently executed.

First, the wireless power reception device 200 can transmit identification data in the identification and configuration phase S630.

The identification data may include information on the version of a wireless power transfer protocol, information on the manufacturer of the wireless power reception device 200, basic device identifier information, information indicating presence or absence of an extended device identifier, etc.

In addition, the wireless power reception device 200 can transmit power data in the identification and configuration phase S630.

The power data may include information on maximum power of the wireless power reception device 200, information on remaining power, power class information, etc.

The wireless power transmission device 100 can identify the wireless power reception device 200 based on the identification data and the power data and obtain power information of the wireless power reception device 200.

The wireless power transmission device 100 can identify the wireless power reception device 200, and proceed to the handover phase S630 when the power information of the wireless power reception device 200 has been obtained.

When the wireless power transmission device 100 does not receive the identification data and/or the power data in the identification and configuration phase S630, the wireless power transmission device 100 can return to the selection phase S610.

The wireless power transmission device 100 can determine whether to change a communication method used for communication with the wireless power reception device 200 in the handover phase S640.

Specifically, in a state in which the wireless power transmission device 100 communicates with the wireless power reception device 200 through the in-band communication method, the wireless power transmission device 100 can determine whether to maintain the in-band communication method or change the in-band communication method to the out-of-band communication method based on the power information of the wireless power reception device 200 obtained in at least one of the selection phase S610, the ping phase S620, and the identification and configuration phase S630.

Further, the wireless power transmission device 100 can determine whether to proceed to the negotiation phase S650 based on a negotiation field value received in the identification and configuration phase S630 or the handover phase S640.

When a negotiation is necessary as a determination result, the wireless power transmission device 100 can proceed to the negotiation phase S650 and perform a foreign object detection (FOD) procedure.

When a negotiation is unnecessary as a determination result, the wireless power transmission device 100 may directly proceed to the power transfer phase S670.

The wireless power transmission device 100 can detect a foreign object FO based on received quality factor information and/or resonant frequency information in the selection phase S610 or the negotiation phase S650.

For example, the wireless power transmission device 100 can store a reference quality factor (Q factor) and/or a reference resonant frequency fo in a normal state and compare a currently received quality factor (Q factor) and/or resonant frequency fo with the reference quality factor (Q factor) and/or the reference resonant frequency fo to determine presence or absence of a foreign object in the charging area. Here, the normal state may mean a case in which only the wireless power reception device 200 is present in the charging area without a foreign object.

When a foreign object is not detected, the wireless power transmission device 100 can proceed to the power transfer phase S670 via the calibration phase S660.

On the other hand, when a foreign object is detected, the wireless power transmission device 100 may return to the selection phase S610 without performing power transfer.

The wireless power transmission device 100 can calculate power loss based on a difference between power transmitted from the wireless power transmission device 100 and power received by the wireless power reception device 200 in the calibration phase S660.

The wireless power transmission device 100 can transfer power to the wireless power reception device 200 in the power transfer phase S670.

In the power transfer phase S670, the wireless power transmission device 100 can receive power control information from the wireless power reception device 200 during power transfer and control characteristics of power applied to coils in response to the received power control information.

For example, the power control information may include control error data, and the wireless power transmission device 100 may increase or decrease the power applied to the coils based on the control error data.

When unexpected data is received, expected data, for example, the power control information, is not received for a predetermined time (time out), power transfer contract violation occurs, or charging is completed in the power transfer phase S670, the wireless power transmission device 100 can return to the selection phase S610.

Further, when a power transfer negotiation needs to be reconfigured in accordance with change of a state of the wireless power transmission device 100 or the wireless power reception device 200 in the power transfer phase S670, the wireless power transmission device 100 can proceed to the renegotiation phase S680. Here, the wireless power transmission device 100 may return to the power transfer phase S670 when a renegotiation is normally completed.

Meanwhile, the renegotiation may be set based on state information of the wireless power transmission device 100 and the wireless power reception device 200. For example, the state information of the wireless power transmission device 100 may include information on a maximum amount of available transmission, information on a maximum number of acceptable wireless power reception devices 200, etc. In addition, the state information of the wireless power reception device 200 may include information on required power, etc.

FIG. 7 is a flowchart for describing a method of selecting an operating coil combination according to an embodiment of the present disclosure, FIG. 8 is a diagram for describing a method of generating a coil combination, FIG. 9 is a diagram illustrating an example of a coil selection signal according to the coil combination of FIG. 8, FIG. 10 is a diagram for describing a factory calibration level of the coil selection signal of FIG. 9, and FIGS. 11 to 13 are diagrams for describing a method of selecting the operating coil combination of FIG. 8.

First, the coil combination generator 161 can generate coil combinations including at least one of a plurality of partially overlapping coils (S710).

Referring to FIG. 8, the coil combination generator 161 can select a single or dual coils from the first to fourth coils 181 to 184 to generate coil combinations in a basic mode.

When the coil combination generator 161 selects a single coil and generates a coil combination in the basic mode, the coil combination generator 161 may select the first coil 181 from the first to fourth coils 181 to 184 and generate a first coil combination. In the same manner, the controller 160 may select the second coil 182 and generate a second coil combination, select the third coil 183 and generate a third coil combination, or select the fourth coil 184 and generate a fourth coil combination.

Meanwhile, when the coil combination generator 161 selects a single coil to generate a coil combination in the basic mode, the coil combination generator 161 can set the selected coil as a main coil through which wireless power transfer and communication will be performed.

On the other hand, when the coil combination generator 161 selects two of the first to fourth coils 181 to 184 to generate a coil combination, the coil combination generator 161 can set any one of the selected coils as a main coil through which wireless power transfer and communication will be performed and set the other coil as an auxiliary coil assisting wireless power transfer.

Accordingly, when the coil combination generator 161 selects two coils to generate a coil combination in the basic mode, the coil combination generator 161 may select the first coil 181 and the second coil 182, generate a fifth coil combination in which the first coil 181 is set as a main coil and the second coil 182 is set as an auxiliary coil, and generate a sixth coil combination in which the first coil 181 is set as an auxiliary coil and the second coil 182 is set as a main coil.

In the same manner, the coil combination generator 161 may select the first coil 181 and the fourth coil 184, generate a seventh coil combination in which the first coil 181 is set as a main coil and the fourth coil 184 is set as an auxiliary coil, and generate an eighth coil combination in which the first coil 181 is set as an auxiliary coil and the fourth coil 184 is set as a main coil.

Further, the coil combination generator 161 may select the second coil 182 and the third coil 183, generate a ninth coil combination in which the second coil 182 is set as a main coil and the third coil 183 is set as an auxiliary coil, and generate a tenth coil combination in which the second coil 182 is set as an auxiliary coil and the third coil 183 is set as a main coil.

Further, the coil combination generator 161 may select the third coil 183 and the fourth coil 184, generate an eleventh coil combination in which the third coil 183 is set as a main coil and the fourth coil 184 is set as an auxiliary coil, and generate a twelfth coil combination in which the third coil 183 is set as an auxiliary coil and the fourth coil 184 is set as a main coil.

Meanwhile, when the coil combination generator 161 selects two of the first to fourth coils 181 to 184 to generate a coil combination in the basic mode, the coil combination generator 161 can generate a coil combination in consideration of a position at which the reception coil 291 is placed on the charging surface.

For example, since the reception coil 281 is not placed only on the first and third coils 181 and 183 or only on the second and fourth coils 182 and 184, a combination of the first and third coils 181 and 193 and a combination of the second and fourth coils 182 and 184 cannot be included in the aforementioned first to twelfth coil combinations.

Consequently, when the coil combination generator 161 selects two of the first to fourth coils 181 to 184 to generate a coil combination in the basic mode, the coil combination generator 161 can generate a coil combination including only coils adjacent to each other.

Meanwhile, the coil combination generator 161 selects one or two of the first to fourth coils 181 to 184 to generate a coil combination only in the basic mode, and the number of coils included in a coil combination may vary according to power of the wireless power reception device 200 (may be proportional to the size of the reception coil).

For example, when the power of the wireless power reception device 200 is high, the coil combination generator 161 may select all of the first to fourth coils 181 to 184 to generate a coil combination as illustrated in FIG. 13.

Subsequently, the controller 160 can transmit a coil selection signal through coils included in coil combinations (S730).

Specifically, the controller 160 can transmit the coil selection signal in a predefined order 910 in FIG. 9.

Meanwhile, a total number of coil combinations generated from the first to fourth coils 181 to 184 may be 12 as shown in FIG. 8, and the controller 160 can transmit the coil selection signal 12 times for each coil combination. Here, the coil selection signal may be a digital ping signal DP.

When the first to fourth coils 181 to 184 transmit the coil selection signal with the same transmission intensity, the intensities of the coil selection signals from the coils may be different on the charging surface on which the wireless power reception device 200 is disposed because the first to fourth coils 181 to 184 are layered and partially overlap, as shown in FIGS. 4 and 5.

For example, transmission voltages Vrail of the coil selection signals and reception voltages Vrect on the charging surface may appear as shown in FIG. 10 in response to distances between the respective coils and the charging surface on which the wireless power reception device 200 is disposed.

In FIG. 10, 1010 indicates change in a reception voltage Vrect with respect to a transmission voltage Vrail of the first coil 181, 1020 indicates change in a reception voltage Vrect with respect to a transmission voltage Vrail of the second coil 182, 1030 indicates change in a reception voltage Vrect with respect to a transmission voltage Vrail of the third coil 183, and 1040 indicates change in a reception voltage Vrect with respect to a transmission voltage Vrail of the fourth coil 184.

As shown in FIG. 10, even when the first to fourth coils 181 to 184 transmit the coil selection signals with the same intensity of 7.6 V, reception voltages Vrect of 9 V to 10.3 V can be detected.

Such intensity differences between the coil selection signals may cause an error in an operating coil combination which will be described later.

To solve this problem, the memory 120 stores transmission intensities of the coil selection signals transmitted from the first to fourth coils 181 to 184, and distances between the coils and the charging surface on which the wireless power reception device 200 is disposed are compensated such that the coil selection signals have the same intensity on the charging surface to set transmission intensities.

The controller 160 can transmit the digital ping signal at a digital ping level of the main coils included in the coil combinations.

Subsequently, the controller 160 can receive a response signal for the coil selection signal through the coils included in the coil combinations (S750).

Since the coil selection signal is the digital ping signal DP, the wireless power reception device 200 can transmit a data packet to the wireless power transmission device 100.

The data packet may include specific information, charging efficiency information, etc. of the wireless power reception device 200.

The specific information may include product information of the wireless power reception device 200, particularly, power consumption information.

Further, the charging efficiency information may include information on power supplied to a load included in the wireless power reception device, and information on required power of the load.

Subsequently, the controller 160 can calculate the response intensity of the response signal for the coil selection signal and charging efficiency of the wireless power reception device 200 (S770).

Specifically, the controller 160 can calculate the response intensity of the response signal for the coil selection signal. For example, the response intensity may be represented as a voltage.

In addition, the controller 160 can calculate the charging efficiency of the wireless power reception device based on a difference or a ratio between the power supplied to the load (e.g., battery) included in the wireless power reception device 200 and the required power of the load.

As described above, the power supplied to the load and the required power of the load can be obtained from the response signal received from the wireless power reception device 200 in S750.

Meanwhile, charging efficiency of wireless power transfer according to inductive coupling is less affected by frequency characteristics but may be affected by an alignment and a distance between the wireless power transmission device 100 and the wireless power reception device 200.

In addition, the charging efficiency may be affected by a coupling coefficient or a mutual inductance between each coil and the reception coil 281.

Further, the charging efficiency may be affected by reactances of the wireless power transmission device 100 and the wireless power reception device 200 for maximum power transfer.

In a case where an operating coil or an operating coil combination to be used for wireless power transfer is selected using only the response intensity of the response signal even though the charging efficiency of the wireless power reception device 200 varies according to an alignment, a distance, coupling coefficients, mutual inductances, reactances, etc. between the wireless power transmission device 100 and the wireless power reception device 200, there may be a coil that is not selected as an operating coil or for an operating coil combination due to a low response intensity while having high charging efficiency.

To solve this problem, the present disclosure can select an operating coil combination in consideration of the charging efficiency of the wireless power reception device 200 as well as the response intensity of the response signal.

That is, the controller 160 can select an operating coil combination to be used for wireless power transfer from the coil combinations based on the response intensity of the response signal for the coil selection signal and the charging efficiency of the wireless power reception device 200 (S790).

Specifically, when the response signal for the coil the controller 160 is received, the controller 160 can apply a weight increasing in proportion to the charging efficiency to the response intensity of the response signal. The response intensity of the response signal to which the weight has been applied may be called a weight-compensated intensity.

The controller 160 can select a coil combination having a highest weight-compensated intensity as an operating coil combination to be used for wireless power transfer among the coil combinations.

For example, when the reception coil 281 is placed as shown in FIG. 12a in the basic mode, a coil combination with a highest response signal intensity may be the fourth coil combination including only the fourth coil 184. Here, the response intensity of a response signal according to the fourth coil combination may be 4.8 V.

The response intensity of a response signal according to the eleventh coil combination in which the third coil 183 is set as a main coil and the fourth coil 184 is set as an auxiliary coil may be 4.2 V. The response intensity of a response signal according to the twelfth coil combination in which the third coil 183 is set as an auxiliary coil and the fourth coil 184 is set as a main coil may be 4.3 V.

The response intensity of the response signal according to the eleventh coil combination or the twelfth coil combination is less than the response intensity of the response signal according to the fourth coil combination because the third coil 183 and the fourth coil 184 overlap and the reception coil 281 is not aligned with any one of the third coil 183 and the fourth coil 184.

However, charging efficiency may be higher in a case where power is transferred through the coil combination including the third and fourth coils 183 and 184 than in a case where the power is transferred only through the fourth coil 184 due to the overlapping area of the third and fourth coils 183 and 184.

Accordingly, the controller 160 can apply a weight in accordance with the charging efficiency to the response signal intensity according to the coil combination including the third and fourth coils 183 and 184. For example, the controller 160 may multiply 4.2 V that is the response signal intensity according to the eleventh coil combination by a weight of 1.1 or add a weight of 0.6 to 4.2 V. The controller 160 may multiply 4.3 V that is the response signal intensity according to the twelfth coil combination by a weight of 1.2 or add a weight of 0.8 to 4.3 V.

Since the response intensity according to the twelfth coil combination is higher than the response intensity according to the fourth coil combination as a result of application of weights to the response intensities, the controller 160 can select the twelfth coil combination including the third and fourth coils 183 and 184 as an operating coil combination to be used for wireless power transfer.

Accordingly, the wireless power transmission device 100 of the present disclosure can charge the wireless power reception device 200 using a combination of the third and fourth coils 183 and 184 with high charging efficiency.

Similarly, when the reception coil 281 is placed as shown in FIG. 12b, a coil combination with a highest response signal intensity may be the first coil combination including only the first coil 181, but the charging efficiency of the seventh coil combination including the first and fourth coils 181 and 184 is higher than that of the first coil combination. Accordingly, the controller 160 can apply a weight in accordance with the charging efficiency to response intensity to select the seventh coil combination as an operating coil combination to be used for wireless power.

Meanwhile, the controller 160 may set a larger weight for a coil combination including a smaller number of coils.

For example, when the wireless power reception device 200 is aligned with coils as shown in FIG. 11a, the controller 160 can selectively apply an additional point to a weight of the fourth coil combination because the number of coils in the fourth coil combination including the fourth coil 184 is less than the number of coils in a coil combination including the third and fourth coils 183 and 184 or a coil combination including the first and fourth coils 181 and 184. Consequently, a weight may increase for a coil combination having a small number of coils.

Accordingly, the controller 160 can select the fourth coil combination having a highest response intensity to which a weight has been applied as an operating coil combination to be used for wireless power.

Meanwhile, an additional point applied to a coil combination may be appropriately set in consideration of alignment of the reception coil 281.

After selection of the operating coil combination, the controller 160 can charge the wireless power reception device 200 using the selected operating coil combination through the phases described in FIG. 6.

When the selected operating coil combination includes a single operating coil, the operating coil serves as a main coil and the controller 160 can wirelessly transfer power to the wireless power reception device 200 through the main coil and communicate with the wireless power reception device 200 through the operating coil.

When the selected operating coil combination includes a plurality of operating coils, the controller 160 can perform wireless power transfer and communication through a main coil and assist wireless power transfer through the remaining auxiliary coil.

FIG. 14 is a flowchart for describing a method of selecting an operating coil combination according to another embodiment of the present disclosure and FIG. 15 is a diagram referred to description of FIG. 14.

Referring to the figures, when the wireless power transmission device 100 generates a coil combination as in S710 in the basic mode, there are cases in which the wireless power transmission device 100 transmits the coil selection digital ping signal CSDP to the coil combination even though the coil combination is not obviously selected as an operating coil combination.

When the reception coil 281 is placed as shown in FIG. 12*a*, for example, it is obvious that a coil combination including the first and second coils 181 and 182 is not selected as an operating coil combination due to low response signal intensity and charging efficiency.

Accordingly, a coil selection signal according to this coil combination may cause a delay in a charging time as well as a delay in an operating coil selection time.

To solve this problem, the coil combination generator 161 can output an object detection signal prior to transmission of the coil selection signal and determine an invalid coil based on current variations in transmission coils with respect to the object detection signal. The coil combination generator 161 can generate a coil combination excluding such an invalid coil.

First, the coil combination generator 161 can transmit the object detection signal through a plurality of coils (S1410).

Specifically, the coil combination generator 161 can transmit the object detection signal through the plurality of coils in a predetermined order. The coil combination generator 161 can transmit the object detection signal prior to transmission of the coil selection signal. Here, the object detection signal may be an analog ping signal AP. Further, a time Tb in which the object detection signal is output may be 120 ms.

When the coil part 180 includes the first to fourth coils 181 to 184, the coil combination generator 161 can output the object detection signal to the first to fourth coils 181 to 185 in order. Accordingly, a total of four object detection signals can be output as shown in FIG. 15.

Meanwhile, when the first to fourth coils 181 to 184 transmit the object detection signals with the same transmission intensity, the intensities of the object detection signals may be different on the charging surface on which the wireless power reception device 200 is disposed because the first to fourth coils 181 to 184 are layered and partially overlap, as shown in FIGS. 4 and 5.

Such differences between the intensities of the object detection signals on the charging surface may cause an error in object coil combination.

Accordingly, the coil combination generator 161 can compensate for distances between the coils and the charging surface on which the wireless power reception device 200 is placed and transmit the object detection signals. Accordingly, the object detection signals can have the same intensity on the charging surface.

Meanwhile, in the case of inductive coupling, the current of a coil may vary when an object including the wireless power reception device 200 is placed on the charging surface.

Further, when the coil part 180 includes partially overlapping coils, as shown in FIGS. 4 and 5, currents of the first and second coils 181 and 182 may vary even though the reception coil 281 is placed as shown in FIG. 12*a*. However, current variations in the first and second coils 181 and 192 may be less than current variations in the third and fourth coils 183 and 184.

Accordingly, the coil combination generator 161 can determine an invalid coil based on current variations in the coils with respect to respective object detection signals (S1430). An invalid coil may refer to a coil that is not used for a coil combination.

When a current variation in a coil is less than a predetermined current variation, the coil combination generator 161 may determine the coil as an invalid coil. On the other hand, when a current variation in a coil is equal to or greater than the predetermined current variation, the coil combination generator 161 can determine the coil as a valid coil.

A valid coil may refer to a coil included in a valid coil combination which will be described later. For example, in FIG. 12*a*, the first and second coils 181 and 182 may be invalid coils and the third and fourth coils 183 and 184 may be valid coils.

The coil combination generator 161 can exclude invalid coils at the time of generation of coil combinations (S1450). Further, the coil combination generator 161 can exclude invalid coils and generate valid coil combinations (S1470). A valid coil combination may refer to a coil combination that will output a coil selection signal.

For example, in FIG. 12*a*, the coil combination generator 161 can exclude the first and second coils 181 and 182 that are invalid coils and generate a valid coil combination including the third and fourth coils 183 and 184 at the time of coil combination.

When a plurality of valid coils is present, the coil combination generator 161 can generate a valid coil combination such that at least one of the plurality of valid coils is included therein.

For example, when the coil combination generator 161 selects only one of the plurality of valid coils and generate a valid coil combination in FIG. 12*a*, the coil combination generator 161 can select the third coil 183 to generate a first valid coil combination and select the fourth coil 184 to generate a second valid coil combination.

Here, the coil combination generator 161 can set the third coil 183 or the fourth coil 184 as a main coil for wireless power transfer and communication.

Further, when the coil combination generator 161 selects all of the plurality of valid coils and generate a valid coil combination in FIG. 12*a*, the coil combination generator 161 can select the third and fourth coils 183 and 184, generate a third valid coil combination in which the third coil 183 is set as a main coil and the fourth coil 184 is set as an auxiliary coil, and generate a fourth valid coil combination in which the third coil 183 is set as an auxiliary coil and the fourth coil 184 is set as a main coil.

Subsequently, the controller 1490 can select an operating coil combination from the valid coil combinations (S1490).

Specifically, the controller 160 can transmit a coil selection signal through the valid coils included in the valid coil combinations and receive a coil selection response signal for the coil selection signal.

A difference from FIG. 7 is that the controller 160 transmits the coil selection signal using only the valid coil combinations so that the number of coil selection signal transmissions is reduced.

For example, the number of coil selection signal transmissions according to coil combinations is 12 in FIG. 9, whereas the number of coil selection signal transmissions according to valid coil combinations can be reduced to 4 in FIG. 15.

Further, a coil selection signal transmission time Ta is about 1200 ms in FIG. 9, whereas a coil selection signal transmission time Tc may be about 400 ms in FIG. 15.

In addition, when a coil selection time including an object detection signal transmission time Tb is calculated in FIG. 15, the coil selection time is further reduced in the case of FIG. 15 in which the coil selection signal is transmitted using valid coil combinations than in the case of FIG. 9 in which the coil selection signal is transmitted using coil combinations because an object detection signal transmission interval is less than one third of a coil selection signal transmission interval.

Experimentally, the transmission time Ta in FIG. 9 is about 1200 ms, whereas the transmission time Tb+Tc in FIG. 15 is reduced by more than half to about 520 ms.

Furthermore, according to reduction in the coil selection time, the total charging time and the number of coil selection signal transmissions can be reduced to decrease power consumption of the wireless power transmission device 100.

Upon reception of a response signal, the controller 160 can select an operating coil combination to be used for wireless power transfer from the valid coil combinations based on the response intensity of the response signal and the charging efficiency of the wireless power reception device and charge the wireless power reception device 200 through the selected operating coil combination.

Specifically, upon reception of a response signal for the coil selection signal, the controller 160 can apply a weight increasing in proportion to the charging efficiency to the response intensity of the response signal.

Further, the controller 160 can set a larger weight for a coil combination having a smaller number of coils.

In addition, the controller 160 can select a coil combination having a highest response signal intensity to which a weight has been applied from coil combinations as an operating coil combination to be used for wireless power.

After selection of the operating coil combination, the controller 160 can charge the wireless power reception device 200 using the selected operating coil combination through the phases described in FIG. 6.

FIG. 16 is a flowchart for describing a method of selecting an operating coil combination according to another embodiment of the present disclosure.

Referring to the figure, when the wireless power transmission device 100 selects only a single or dual coils from the first to fourth coils 181 to 184 to generate a coil combination, as shown in FIGS. 7 to 13, the amount of power transmitted from the wireless power transmission device 100 may be limited.

Further, since the size of the reception coil 281 increases in proportion to required power of the wireless power reception device 200 in general, the wireless power transmission device 100 and the wireless power reception device 200 cannot be aligned and thus charging efficiency may decrease when the wireless power transmission device 100 selects only a single or dual coils from the first to fourth coils 181 to 184 to generate a coil combination.

To solve such problems, the wireless power transmission device 100 can change the number of operating coils included in a coil combination depending on the power of the wireless power reception device 200.

First, the coil part 180 can receive specific information from the wireless power reception device 200 (S1610). The specific information may include product information of the wireless power reception device 200, particularly, power consumption information.

Subsequently, the coil combination generator 161 can calculate the power of the wireless power reception device 200 based on the specific information (S1630). Here, the power may mean power consumption of the wireless power reception device 200. When a load of the wireless power reception device 20 is a battery, the power may mean required power of the battery.

Subsequently, the coil combination generator 161 can calculate the number of operating coils to operate for wireless power transfer based on the power of the wireless power reception device 200 (S1650). Further, the coil combination generator 161 can generate coil combinations in response to the number of operating coils to operate (S1670).

The coil combination generator 161 can generate coil combinations such that one or two of the first to fourth coils 181 to 184 are included therein when the calculated power of the wireless power reception device 200 is included in a first range. For example, the first range may be a range of 0 W to 15 W.

Consequently, when the power of the wireless power reception device 200 is included in the first range, the wireless power transmission device 100 can operate in the basic mode, as described in FIG. 7.

The coil combination generator 161 can generate coil combinations such that three or four of the first to fourth coils 181 to 184 are included therein when the power of the wireless power reception device 200 is included in a second range greater than the first range. For example, the second range may be a range of 15 W to 30 W.

When the coil combination generator 161 selects three coils to generate coil combinations in the second range, the coil combination generator 161 may select the first, second, and third coils 181, 182, and 183 to generate a first coil combination. In the same manner, the coil combination generator 161 may select the second, third, and fourth coils 182, 183, and 184 to generate a second coil combination, select the third, fourth, and first coils 183, 184, and 181 to generate a third coil combination, and select the fourth, first, and second coils 184, 181, and 182 to generate a fourth coil combination.

In addition, when the coil combination generator 161 selects four coils to generate a coil combination in the second range, the coil combination generator 161 may select the first to fourth coils 181 to 184 to generate a fifth coil combination.

When the power of the wireless power reception device is included in a third range greater than the second range, the coil combination generator 161 may select all of the first to fourth coils 181 to 184. For example, the third range may be a range of 30 W to 60 W.

Meanwhile, the controller 160 can transmit the coil selection signal through the coil combinations generated by the coil combination generator 161 and select an operating coil combination from the coil combinations based on the response intensity of a response signal for the coil selection signal and the charging efficiency of the wireless power reception device 200 as in FIG. 7.

After selection of the operating coil combination, the controller 160 can charge the wireless power reception device 200 using the selected operating coil combination through the phases described in FIG. 6.

As the wireless power transmission device 100 changes the number of coils included in a coil combination depending on the capacity of the wireless power reception device 200, the wireless power transmission device 100 can charge wireless power reception devices 200 with various power levels.

FIG. 17 is a flowchart for describing a method of selecting an operating coil combination according to another embodiment of the present disclosure.

Referring to the figure, the wireless power transmission device 100 can communicate with the wireless power reception device 200 through the in-band communication method, as described above.

The wireless power transmission device 100 can modulate a first transmission target packet including various types of control information according to frequency shift keying (FSK) and transmit the modulated first transmission target packet to the wireless power transmission device 100 at the time of in-band communication.

The wireless power reception device 100 can modulate a second transmission target packet according to amplitude-shift keying (ASK) and transmit the modulated second transmission target packet to the wireless power reception device 200 at the time of in-band communication.

The second transmission target packet may include information on a current intensity applied to the reception coil 281, information on required power of a load, reception power intensity information, state information, etc.

Meanwhile, the FSK is advantageous for transmission of a transmission target packet of several bytes but has a problem that a transmission speed decreases as the capacity of the transmission target packet increases.

Particularly, since the capacity of data that needs to be transmitted for authentication and control of the wireless power reception device 200 increases as the power of the wireless power reception device 200 increases, a communication time may increase in the case of a large-capacity wireless power reception device 200. Such communication time increase may bring about charging time increase.

To solve such problems, the controller 160 can change a communication method in response to the power of the wireless power reception device 200.

First, the coil part 180 can receive specific information from the wireless power reception device 200 (S1710).

Specifically, the wireless power reception device 200 can transmit the specific information thereof at the request of the wireless power transmission device 100 or periodically through the in-band communication method. The specific information may include product information of the wireless power reception device 200, particularly, power consumption information and device address information.

The wireless power reception device 200 can transmit the specific information in at least one of the selection phase S610, the phase S620, and the identification and configuration phase S630 of FIG. 6.

Subsequently, the coil combination generator 161 can calculated the power of the wireless power reception device 200 based on the specific information (S1730). Here, the power may mean power consumption of the wireless power reception device 200. When a load of the wireless power reception device 200 is a battery, the power may mean required power of the battery.

The coil combination generator 161 can transmit information on the power of the wireless power reception device 200 to the controller 160.

Subsequently, the controller 160 can determine whether to change the communication method used for communication with the wireless power reception device 200 based on the calculated power of the wireless power reception device 200 in a state of communication with the wireless power reception device 200 through in-band communication (S1750).

The controller 160 can maintain the in-band communication when the calculated power of the wireless power reception device is less than a reference power (S1770).

Here, the reference power may be identical to an upper value of the second range or a lower limit of the third range in FIG. 16. For example, when power ranges of wireless power reception devices 200 are classified into the first range (0 W to 15 W), the second range (15 W to 30 W) and the third range (30 W to 60 W) as in FIG. 16, the reference power may be 30 W.

The controller 160 can communicate with the wireless power reception device 200 through the first communication unit 140 according to the in-band communication.

The first communication unit 140 can perform predetermined signal processing on state information, power control information, etc. of the wireless power transmission device 200, transmit the processed information to the wireless power reception device 200 through the in-band communication, receive state information, information on the amount of power used, charging efficiency information, etc. of the wireless power reception device 200 through in-band communication, perform predetermined signal processing on the received information and transmit the processed information to the controller 160.

According to an embodiment, the first communication unit 140 may be included in the controller 160 as a component.

When the calculated power of the wireless power reception device 200 is equal to or greater than the reference power, the controller 160 can change the communication method to out-of-band communication and communicate with the wireless power reception device 200 through the out-of-band communication (S1790).

The controller 160 can communicate with the wireless power reception device 200 through the second communication unit 150 according to the out-of-band communication.

The second communication unit 140 can perform predetermined signal processing on the state information, the power control information, etc. of the wireless power transmission device 200, transmit the processed information to the wireless power reception device 200 through the out-of-band communication, receive the state information, the information on the amount of power used, the charging efficiency information, etc. of the wireless power reception device 200 through out-of-band communication, perform predetermined signal processing on the received information and transmit the processed information to the controller 160.

The out-of-band communication may be any one of Bluetooth communication, Bluetooth low energy (BLE) communication, near field communication (NFC), radio frequency identification (RFID) communication, and Zigbee communication.

The second communication unit 150 may be included in the wireless power transmission device 100 in the form of a module.

For example, a BLE communication module may be electrically connected to the controller 160 in the wireless power transmission device 100. Here, the controller 160 can receive a device address of the wireless power reception device 200 through in-band communication and perform pairing with the wireless power reception device based on the device address. The device address may be included in the specific information of the wireless power reception device 200 received in S1710.

Further, the controller 160 can change the communication method and perform BLE communication with the wireless power reception device 200 upon pairing with the wireless power reception device 200.

On the other hand, the controller 160 can communicate with the wireless power reception device 200 through the in-band communication method when out-of-band communication with the wireless power reception device 200 has failed (S1810 and S1770).

Meanwhile, the controller 160 of the present disclosure can be implemented as processor-readable code in a processor-readable recording medium included in the power transmission device 100. The processor-readable recording medium includes any kind of recording device in which data readable by a processor is stored. Examples of the processor-readable recording medium include a ROM, a RAM, a CD-ROM, a magnetic tape, a floppy disk, an optical data storage device, etc. and also include implementation in the form of a carrier wave such as transmission through the Internet. Further, the processor-readable recording medium may be distributed to computer systems connected through a network, and processor-readable code may be stored and executed in a distributed manner.

Although preferred embodiments of the present disclosure have been described above, the present disclosure is not limited to the above-described specific embodiments and those skilled in the art will appreciate that various modifications and variations can be made in the present disclosure without departing from the spirit or scope of the present disclosure described in the appended claims. Such modifications should not be individually understood from the technical scope or prospect of the present disclosure.

What is claimed is:

1. A wireless power transmission device, comprising:
   a coil part including a plurality of partially overlapping coils; and
   a controller configured to:
   transmit a coil selection signal through each of coil combinations including at least one of the plurality of coils,
   receive a response signal for the coil selection signal through each of the coil combinations,
   apply a weight corresponding to charging efficiency of a wireless power reception device to a response intensity of the response signal, and
   select a coil combination having a highest weight-compensated intensity as an operating coil combination from the coil combinations.

2. The wireless power transmission device of claim 1, wherein the coil part includes first to fourth coils disposed to partially overlap.

3. The wireless power transmission device of claim 1, wherein, when generating the coil combinations by selecting two or more of the plurality of coils, the controller is configured to:
   set any one of the coils as a main coil for wireless power transfer and communication, and
   set the remaining coil or coils as an auxiliary coil or coils for assisting wireless power transfer.

4. The wireless power transmission device of claim 1, wherein the weight increases in proportion to the charging efficiency.

5. The wireless power transmission device of claim 4, wherein the controller is configured to set a larger weight for a coil combination having a smaller number of coils.

6. The wireless power transmission device of claim 1, wherein the controller is configured to calculate the charging efficiency of the wireless power reception device based on a ratio of power supplied to a load included in the wireless power reception device to required power of the load.

7. The wireless power transmission device of claim 1, further comprising a memory storing transmission intensities of coil selection signals transmitted from the plurality of coils,
   wherein the transmission intensities are set by compensating for distances between the coils and a charging surface on which the wireless power reception device is disposed.

8. The wireless power transmission device of claim 1, wherein the controller is configured to:
   transmit an object detection signal through the plurality of coils,
   determine an invalid coil based on current variation with respect to the object detection signal,
   generate valid coil combinations excluding the invalid coil, and
   select the operating coil combination from the valid coil combinations.

9. The wireless power transmission device of claim 8, wherein the controller is configured to determine the invalid coil when the current variation is less than a predetermined current variation.

10. The wireless power transmission device of claim 8, wherein, when there is a plurality of valid coils excluding the invalid coil, the controller is configured to generate the valid coil combination including at least one of the plurality of valid coils.

11. The wireless power transmission device of claim 1, wherein the controller is configured to:
    receive specific information of the wireless power reception device through the plurality of coils,
    calculate power of the wireless power reception device,
    calculate the number of operating coils based on the power, and
    generate the coil combinations in response to the number of operating coils.

12. The wireless power transmission device of claim 11, wherein the controller is configured to:
    generate coil combinations including one or two of the first to fourth coils when the power is included in a first range,
    generate coil combinations including three or four of the first to fourth coils when the power is included in a second range greater than the first range, and
    select all the first to fourth coils as a coil combination when the power is included in a third range greater than the second range.

13. The wireless power transmission device of claim 11, wherein, when the power is less than a predetermined reference power in a state of communication with the wireless power reception device through in-band communication, the controller is configured to maintain the in-band communication.

14. The wireless power transmission device of claim 13, wherein, when the power is equal to or greater than the predetermined reference power, the controller is configured to change the communication method and communicates with the wireless power reception device through out-of-band communication.

15. The wireless power transmission device of claim 14, wherein the controller is configured to communicate with the wireless power reception device through the in-band communication method when the out-of-band communication with the wireless power reception device has failed.

16. The wireless power transmission device of claim 14, wherein the controller is configured to:
   receive a device address of the wireless power reception device through the in-band communication,
   perform pairing with the wireless power reception device based on the device address, and
   change the communication method to communicate with the wireless power reception device through the out-of-band communication upon pairing with the wireless power reception device.

17. A method for operating a wireless power transmission device comprising a plurality of partially overlapping coils, the method comprising:
   transmitting a coil selection signal through each of coil combinations including at least one of the plurality of coils;
   receiving a response signal for the coil selection signal through each of the coil combinations;
   applying a weight corresponding to charging efficiency of a wireless power reception device to a response intensity of the response signal; and
   selecting a coil combination having a highest weight-compensated intensity as an operating coil combination from the coil combinations.

18. The wireless power transmission method of claim 17, further comprising:
   transmitting an object detection signal through the plurality of coils;
   determining an invalid coil based on current variation with respect to the object detection signal; and
   generating valid coil combinations excluding the invalid coil, and
   wherein the selecting of the coil combination as the operating coil combination comprises selecting the coil combination from the valid coil combinations.

19. The wireless power transmission method of claim 17, further comprising:
   receiving specific information of the wireless power reception device through the plurality of coils;
   calculating power of the wireless power reception device based on the specific information;
   calculating the number of operating coils based on the power; and
   generating the coil combinations in response to the number of operating coils.

20. The wireless power transmission method of claim 19, further comprising changing a communication method to communicate with the wireless power reception device through out-of-band communication when the power is equal to or greater than a predetermined reference power in a state of communication with the wireless power reception device through in-band communication.

* * * * *